United States Patent
Hamilton et al.

(10) Patent No.: US 10,924,727 B2
(45) Date of Patent: Feb. 16, 2021

(54) HIGH-PERFORMANCE LIGHT FIELD DISPLAY SIMULATOR

(71) Applicant: Avalon Holographics Inc., St. John's (CA)

(72) Inventors: Matthew Hamilton, St. John's (CA); Matthew Troke, St. John's (CA); Chuck Rumbolt, St. John's (CA); Robert Lockyer, St. John's (CA); Donovan Benoit, St. John's (CA); Thomas Butyn, St. John's (CA)

(73) Assignee: Avalon Holographics Inc., St. John's (CA)

( * ) Notice: Subject to any disclaimer, the term of this patent is extended or adjusted under 35 U.S.C. 154(b) by 0 days.

(21) Appl. No.: 16/156,421

(22) Filed: Oct. 10, 2018

(65) Prior Publication Data
US 2020/0120328 A1 Apr. 16, 2020

(51) Int. Cl.
*H04N 13/327* (2018.01)
*H04N 13/117* (2018.01)
(Continued)

(52) U.S. Cl.
CPC ......... *H04N 13/327* (2018.05); *H04N 13/117* (2018.05); *H04N 13/344* (2018.05); *H04N 13/368* (2018.05)

(58) Field of Classification Search
CPC .. H04N 19/597; H04N 13/161; H04N 13/128; H04N 19/436; H04N 13/307;
(Continued)

(56) References Cited

U.S. PATENT DOCUMENTS 4,964,088 A * 10/1990 Chittineni .............. G01V 1/303
 367/51
6,549,308 B1 4/2003 Camahort
(Continued)

FOREIGN PATENT DOCUMENTS

CN 107563088 A 1/2018

OTHER PUBLICATIONS

Alpaslan, Z. Y., Hussein S. El-Ghoroury, Jingbo Cai. "Parametric Characterization of Perceived Light Field Display Resolution." Society for Information Display International Symposium Digest of Technical Papers, 2016. vol. 47-1, pp. 1214-1245.
(Continued)

*Primary Examiner* — Dave Czekaj
*Assistant Examiner* — Kehinde Abimbola

(57) ABSTRACT

A simulator for light field displays. A high-performance simulator that can operate in real-time, allowing for VR-based evaluation of display designs. These capabilities allow for rapid exploration of display parameters (e.g. angular and hogel resolution, field of view, etc.), the visualization of how the angular spread of the rays that can affect quality and the evaluation of artifacts from light field processing. Additionally, the high-throughput nature of the simulation makes it amenable for use in the evaluation of light processing procedures such as those involved in light field rendering and compression contexts. The speed and ease with which one can explore light field display parameters makes this simulator the ideal tool for light field content design and evaluation.

30 Claims, 13 Drawing Sheets

(51) Int. Cl.
*H04N 13/344* (2018.01)
*H04N 13/368* (2018.01)

(58) Field of Classification Search
CPC .. H04N 13/122; H04N 13/178; H04N 13/243; H04N 13/327; H04N 13/368; H04N 13/117; H04N 13/344; G02B 27/0172; G02B 2027/0174; G02B 30/26; G02B 2027/0127; G02B 2027/0138; G02B 2027/014; G02B 30/27; G02B 27/0101; G02B 2027/0178; G02B 27/0093
See application file for complete search history.

(56) References Cited

U.S. PATENT DOCUMENTS

| | | | | |
|---|---|---|---|---|
| 8,259,134 | B2* | 9/2012 | Mital | G06T 11/206 |
| | | | | 345/630 |
| 9,216,569 | B2* | 12/2015 | Turke | B41F 33/0036 |
| 10,609,362 | B2* | 3/2020 | Meacham | G02B 30/26 |
| 2010/0220176 | A1* | 9/2010 | Ziemeck | A61N 1/36046 |
| | | | | 348/50 |
| 2010/0321407 | A1* | 12/2010 | Mital | G06T 11/206 |
| | | | | 345/643 |
| 2012/0092232 | A1* | 4/2012 | Burnett | G06F 3/1438 |
| | | | | 345/1.1 |
| 2013/0021456 | A1* | 1/2013 | Inoue | H04N 13/144 |
| | | | | 348/51 |
| 2015/0040785 | A1* | 2/2015 | Turke | G01J 3/501 |
| | | | | 101/171 |
| 2015/0053848 | A1* | 2/2015 | Gardner | G03H 1/0808 |
| | | | | 250/226 |
| 2015/0277378 | A1* | 10/2015 | Smithwick | G03H 1/0808 |
| | | | | 359/9 |
| 2016/0021355 | A1* | 1/2016 | Alpaslan | H04N 13/30 |
| | | | | 348/43 |
| 2016/0026253 | A1* | 1/2016 | Bradski | G02B 27/0172 |
| | | | | 345/8 |
| 2016/0173855 | A1* | 6/2016 | Michel | G02B 5/04 |
| | | | | 348/46 |
| 2018/0253884 | A1* | 9/2018 | Burnett, III | H04N 13/398 |
| 2018/0262758 | A1* | 9/2018 | El-Ghoroury | H04N 19/44 |
| 2018/0309981 | A1* | 10/2018 | Meacham | H04N 13/32 |
| 2018/0352254 | A1* | 12/2018 | Alpaslan | H04N 21/8133 |
| 2019/0094981 | A1* | 3/2019 | Bradski | G02B 30/26 |
| 2019/0362514 | A1* | 11/2019 | Sinha | G06K 9/6212 |

OTHER PUBLICATIONS

Burnett, Thomas L. "Light-field Display Architecture and the Challenge of Synthetic Light-field Radiance Image Rendering." SID Digest, 2017. vol. 61-1, pp. 899-902.

Catmull, E. "A subdivision algorithm for computer display of curved surfaces." PhD thesis, University of Utah, 1974.

Chai, J.-X., Xin Tong, Shing-Chow Chan, and Heung-Yeung Shum. "Plenoptic Sampling" SIGGRAPH '00 Proceedings of the 27th Annual Conference on Computer Graphics and Interactive Techniques, Jul. 2000. pp. 307-318.

Clark, J. J., Matthew R. Palmer and Peter D. Lawrence. "A Transformation Method for the Reconstruction of Functions from Nonuniformly Spaced Samples" IEEE Transactions on Acoustics, Speech, and Signal Processing. Oct. 1985. pp. 1151-1165. vol. ASSP-33, No. 4.

Fattal, D., Z. Peng, T. Tran, S. Vo, M. Fiorentino, J. Brug and R. G. Beausoleil "A Multi-directional backlight for a wide-angle, glasses-free 3D display" 2013 IEEE Photonics Conference, IPC 2013, vol. 495, No. 7441, pp. 24-25, 2013.

Gortler, S. J., Radek Grzeszczuk, Richard Szeliski, and Michael F. Cohen. "The Lumigraph" SIGGRAPH '96 Proceedings of the 23rd Annual Conference on Computer Graphics and Interactive Techniques, Aug. 1996. pp. 43-52.

Halle, M. W., and Adam B. Kropp. "Fast Computer Graphics Rendering for Full Parallax Spatial Displays" SPIE, 1997. pp. 1-8.

Hamilton, M., Chuck Rumbolt, Thomas Butyn, Donovan Benoit, Robert Lockyer, Matthew Troke. "Light Field Display Simulator for Experience and Quality Evaluation." Society for Information Display International Symposium Digest of Technical Papers, 2018. vol. 49-1, pp. 1523-1526.

Huang, H., Hong Hua. "Modeling the Eye's Response in Viewing 3D Light Field Display." OSA Technical Digest, 2017.

Lee, B.-R., Jung-Young Son, Hyoung Lee, Sumio Yano, Hyung Ki Son, "A Simulator for a Light Field Display." Proc. SPIE 10219, Three-Dimensional Imaging, Visualization, and Display 2017, 102190D (May 10, 2017); doi: 10.1117/12.2263612.

Huang, H., Hong Hua. "3D Light Field Displays." Optics Express, vol. 25-16, pp. 18508-18525, 2017.

Klug, M., Thomas Burnett, Angelo Fancello, Anthony Heath, Keith Gardner, Sean O'Connell, Craig Newswanger. "A Scalable, Collaborative, Interactive Light-field Display System." Society for Information Display International Symposium Digest of Technical Papers, 2013. vol. 44-1, pp. 412-415.

Levoy, M., and Pat Hanrahan. "Light Field Rendering" SIGGRAPH. pp. 1-12.

Marschner, S. R., & Lobb, R. J. (1994). An evaluation of reconstruction filters for volume rendering. In VIS '94: Proceedings of the conference on Visualization '94 (pp. 100-107). Los Alamitos, CA, USA: IEEE Computer Society Press.

Matsubara, R., Zahir Y. Alpaslan, Huessein S. El-Ghoroury. "Light field display simulation for light field quality assessment." Proc. SPIE 9391, Stereoscopic Displays and Applications XXVI, 93910G, 2015.

Vieri, C., Grace Lee, Nikhil Balram, Sang Hoon Jung, Joon Young Yang, Soo Young Yoon, In Byeong Kang. "An 18" megapixel 4.3" 1443 ppi 120Hz OLED display for wide field of view high acuity head mounted displays." Journal of the Society for Information Display, vol. 26-5, pp. 314-324, May 2018.

Zwicker, M., W. Matusik, F. Durand, H. Pfister. "Antialiasing for Automultiscopic 3D Displays" Eurographics Symposium on Rendering. 2006.

Wang, Z., Bovik, A. C., Sheikh, H. R., & Simoncelli, E. P. (2004). Image quality assessment: From error visibility to structural similarity. IEEE Transactions on Image Processing, 13(4), 600-612. https://doi.org/10.1109/TIP.2003.819861.

* cited by examiner

90

92

94

96

98

100

102

HIGH-PERFORMANCE LIGHT FIELD DISPLAY SIMULATOR

FIELD OF THE INVENTION

The present disclosure relates to the computer-aided simulation method for the design of three-dimensional light field display technologies, and more specifically, a virtual simulator to model light field displays for display parameter optimization and light field display content quality evaluation.

BACKGROUND OF THE INVENTION

Glasses-free 3D light field displays have recently shown promise to deliver compelling new visual experiences. As technology advances, higher quality displays have been developed and even further enhancements are expected on the horizon. Such advancements however require significant monetary investment and time. In lieu of fabricating physical display prototypes and subjecting them to extensive testing and metrology, only to redesign and refabricate the display, simulation tools which can help predict display design performance before manufacturing can reduce costs and mitigate risk, ensuring more informed decision making. Additionally, there has been a long-felt need in the 3D display content creation industry for interfaces that make light field i.e. holographic content design more accessible and streamline. Many content designers do not have access to the expensive light field display equipment for which they are designing, and a light field display simulator would enable them to more easily design content appropriate for their intended light field display. Such an interface would allow for the evaluation of artifacts resultant from display designs and compression and decompression techniques and their subsequent optimization.

Several light field display simulators used for the visualization of light field displays are previously known in the art. However, none of these methods provide for a simulation of realistic, physical light field displays and their viewing experience. Light field displays are complex technologies whose display image is displayed by an array of directional pixels i.e. pixels that distribute different light rays at different angles. The design of these intricate systems requires simulators that can accurately model display performance. However, such realistic simulators, due to the vast amount of computations required in processing each individual directional pixel's light rays, among other factors, can prove to be computationally intensive. The current state of computer hardware and software, among other factors, are primary causes for such performance hindrances.

Fattal et al. in "A Multi-directional backlight for a wide-angle, glasses-free 3D display" [6] employs a computer cluster using the parallel version of MEEP with 256 simultaneous cores in order to simulate individual optical elements. These simulations are based on electromagnetic wave propagation and model light transport at a very fine scale, whose computational complexity is such that simulating an entire display would be infeasible given current computing capabilities.

In "Parametric Characterization of Perceived Light Field Display Resolution," Alpaslan et al. [1] analyzed and simulated parametrically the perceived resolution of a light field display by taking human visual systems and perceived display depth range into account. By rendering points that appeared at various distances away from the display surface and between the front depth plane and the back depth plane, they were able to examine the modulation transfer function (MTF) (a measure of perceived spatial resolution of imaging systems) of these points at the spatial frequency of the hogel at the level of the display and evaluate the angular frequency of the hogel at the display surface observed by the viewer. While these methods are useful for simulating the perceived resolution of a light field display from the human visual system perspective and analyzing the relationship of the perceived resolution with the depth perception, underlying display pixel pitch, pixel fill factor and hogel pitch, the simulation's resolution contains a large number of light rays, which simply requires considerable computational effort with zero capacity to simulate in real-time. While this tool allows for a glimpse into specific display sub-systems, they become computationally intensive when considered at the whole display system level.

As detailed in "Light field display simulation for light field quality assessment," Matsubara et al. [16] developed a simulation software that uses display parameters, viewer location and orientation, viewer pupil size and focus location to simulate full parallax light field displays of various geometry and complexity from the perspective of an observer. This simulator is based on a camera-like observer that can focus and has a specified pupil diameter. The simulation software discussed by Matsubara et al. [16] models light transmission at a sub-hogel spatio-angular resolution, which leads to a lengthy light field display simulation time that does not come close to reaching interactive rates using current computing platforms, even with their GPU-accelerated results provided.

Huang and Hua, "Systematic Characterization and Optimization of 3D Light Field Displays" [11] present a systematic method to simulate and characterize the retinal image and the accommodation response rendered by a light field display based on quantitatively evaluating the modulation transfer functions of the perceived retinal image of a light field display for the ocular factors of the human visual system. Additionally, Huang and Hua, "Modeling the Eye's Response in Viewing 3D Light Field Display" [10] present a simulation for modeling the eye's response when viewing different 3D light field displays, subject to different parameters that affect the characteristics of the 3D light field display. While this framework is useful in investigating the trade-offs and guidelines for an optimal 3D light field display design, the schematic eye model which is used to evaluate the eye's response while viewing the simulated light field display comes with a high computational cost, particularly at the scale of a full display, making real-time exploration unfeasible.

Levoy and Hanrahan [14] describe a method for generating new camera views of a light field given arbitrary camera positions, without depth information or feature mapping. The method works by combining and resampling the given images and interpreting them as 2D slices of a light field. To generate a novel camera view, this method resamples the rays required to simulate the camera image from the light field generated from the given views. In this way, this technique can be seen to simulate the viewing of a light field display from novel observer positions, where the observer is modelled as a pinhole camera model. The technique generates the spatial and angular coordinates for re-sampling the light field by rasterization of quadrilaterals. This is an elegant technique which efficiently exploits hardware rasterization capabilities in modern accelerated graphics processors, however it is limited to light fields whose angular components are planar-parameterized, which may not be true in real light field displays due to alternate designs or manufacturing limitations. Another apparent limitation of this technique is that computationally, the number of reconstruction operations required relative to the light field data is proportional to the size of the observer image simulated. For modern and upcoming high-resolution virtual reality displays, this resolution will be high in practice, thus making this technique appear to be less efficient.

CN Patent No. 107563088A discloses a light field display device simulating method based on a ray tracing algorithm. The ray-tracing procedure is described as tracing rays from a pinhole observer's focal point to a light field display comprised of an LCD and a lens array. This technique is computationally intensive, particularly when used on current accelerated graphics hardware.

Lee et al. in "A Simulator for a Light Field Display" [12] describes a simulator which is employed to inform the expected visual perception characteristics of a light field display which projects several different view images simultaneously to each of the viewer's eyes. This simulator seeks to demonstrate the visual perception characteristics of the image from a claimed light field display. This simulator however is a physical simulator model, comprised of 16 pico-projectors, mirrors and an observer mask with viewing slits.

There remains a need for a high-performance software simulator that can simulate light field displays rapidly. Such a simulator would support the rapid exploration of display parameters (angular and hogel resolution, field of view, etc.) and evaluation of artifacts from light field processing such as rendering, compression, and decompression, without requiring a physical construction. The high-performance of the simulator described herein allows for the rapid exploration of current and future light field display technologies, making it easier and more affordable to design, parameterize and evaluate such display.

SUMMARY OF THE INVENTION

The present invention provides a high-performance method of exploring the parameterization of simulated virtual three-dimensional light field displays. This method uses a canonical image generation method as part of its computational process to simulate a virtual observer's view(s) of a simulated light field display. The canonical image method provides for a robust, fast and versatile method for generating a simulated light field display and the light field content displayed thereon.

Compared to existing methods, the light field display simulation method we present has several advantages. The method makes several simplifications over existing methods that afford the method some apparent computational advantages. The first simplification is the use of a pinhole eye model for the observer (though the method described can also be adopted to a finite aperture eye model and should not be considered limited in its capabilities in this way). Another simplification is the assumption that an individual hogel of a 3D display is indivisible spatially. This removes the ability to model aspects of a 3D display such as the screen door effect caused by moiré effects that can be caused by aspects of the display at a level of spatial resolution beneath the size of the hogel [16], but it also greatly reduces the complexity of the computations required as less rays must be modelled. This is a reasonable trade-off in terms of certain use of simulations and in a situation where this optical effect is so minor from a human perception perspective that it can be ignored for the purposes of most simulation contexts. Based on the indivisibility of hogels and the eye model assumptions made, we define a concept of a canonical image which is an intermediate image that captures the essential information contained in a simulated observer view. Additionally, this intermediate image allows one in practice to reduce the number of computationally complex reconstruction calculations required from the input light field image compared to an existing light field observer simulation method described previously by Levoy et. al, especially in the context of creating high resolution simulated observer images to match the retinal sampling capability of the human eye.

It is another object of the invention that light field content i.e. a three-dimensional scene, is presented on the simulated light field display to evaluate display capabilities, potential artifacts from light field compression/decompression techniques and the quality and suitability of light field content for presentation on specific displays. Understanding how specific content will be perceived on specific displays enables content designers to tailor content to existing or future displays without having to make the investment of purchasing such a display or seeking out the desired display every time they wish to evaluate content.

In accordance with the aforementioned and other objectives, a light field display simulator provides an effective and efficient method for designing, evaluating and optimizing light field displays and light field display content. A 3D environment is modeled and rendered as a light field whose resolution matches the properties of the display to be simulated—or alternatively captured using a series of cameras or a hybrid method thereof—in a commercial or custom 3D modeling program. From the light field and the given specification of display to be simulated, a canonical image is created. The canonical image data is displayed on the simulated light field display and a virtual observer can view the simulation.

According to one aspect, there is provided a computer-implemented method for simulating a light field display, comprising the steps of:
    a. providing to a computer processor a plurality of data inputs comprising information for a light field image, an observer location and a set of hogels, each hogel with a plurality of hogel pixels, in a display device;
    b. processing the plurality of data inputs by applying a camera capture computational process to generate a canonical image data output, said canonical image data output corresponding to a plurality of light rays, each of the light rays with a first end point at a hogel from the set of hogels in the display device and a second end point at a ray intersection point corresponding to the observer location relative to the display device; and
    c. using the canonical image data output to evaluate an observer view of a simulated light field display.

In one embodiment of the method, the observer view of the simulated light field display is displayed on a physical display screen.

In another embodiment of the method, the information for the set of hogels in the display device includes display calibration information.

In a further embodiment of the method, the display calibration information includes a principal direction of at least one hogel pixel's light ray emissions within each of the hogels in the display device and a point-spread function describing how the at least one hogel pixel's light ray emissions are distributed in all directions including the principal direction.

In still a further embodiment of the method, the camera capture computational process is based on a pinhole camera model.

In yet another embodiment of the method, the camera capture computational process is based on a multi-camera model.

In yet a further embodiment, the canonical image data output is generated by applying a point-spread function image reconstruction computational process.

In one embodiment of the method, the point-spread function image reconstruction computational process is applied with reference to a sample of hogel pixels within the plurality of hogel pixels of each hogel, selected such that light rays emitted from one hogel pixel within the sample have an overlap with light rays emitted from of another hogel pixel within the sample.

In another embodiment of the method, the point-spread function image reconstruction computational process uses a Gaussian function.

In yet another embodiment, the canonical image data output is generated by applying a nearest neighbourhood reconstruction computational process.

In a further embodiment, the canonical image data output is used in a texture mapping computational process to render the observer view of the simulated light field display.

In still a further embodiment of the method, the rendered observer view of the simulated light field display is viewed using a head-mounted display device.

In yet a further embodiment of the method, the head-mounted display device is a virtual reality viewing device.

In still another embodiment of the method, the head-mounted display device is an augmented reality viewing device.

In another embodiment of the method, steps a) to c) are repeated changing the information for the observer location to provide for the evaluation of multiple observer views of the simulated light field display.

In one aspect, there is provided a computing system comprising at least one processor and at least one display device, the at least one processor configured to carry out a method for simulating a light field display, comprising the steps of:

a. providing to the at least one processor a plurality of data inputs comprising information for a light field image, an observer location and a set of hogels, each hogel with a plurality of hogel pixels, in a display device;
 b. processing the plurality of data inputs by applying a camera capture computational process to generate a canonical image data output, said canonical image data output corresponding to a plurality of light rays, each of the light rays with a first end point at a hogel from the set of hogels in the display device and a second end point at a ray intersection point corresponding to the observer location relative to the display device; and
 c. c) using the canonical image data output to evaluate an observer view of a simulated light field display.

In one embodiment of the system, the observer view of the simulated light field display is displayed on a physical display screen.

In another embodiment of the system, the information for the set of hogels arranged in the display device includes display calibration information.

In a further embodiment of the system, the display calibration information includes a principal direction of at least one hogel pixel's light ray emissions within each of the hogels in the display device and a point-spread function describing how the at least one hogel pixel's light ray emissions are distributed in all directions including the principal direction.

In still a further embodiment of the system, the camera capture computational process is based on a pinhole camera model.

In yet a further embodiment of the system, the camera capture computational process is based on a multi-camera model.

In another embodiment of the system, the canonical image data output is generated by applying a point-spread function image reconstruction computational process.

In still another embodiment of the system, the point-spread function image reconstruction computational process is applied with reference to a sample of hogel pixels within the plurality of hogel pixels of each hogel, selected such that light rays emitted from one hogel pixel within the sample have an overlap with light rays emitted from of another hogel pixel within the sample.

In a further embodiment of the system, the point-spread function image reconstruction computational process uses a Gaussian function.

In still a further embodiment of the system, the canonical image data output is generated by applying a nearest neighbourhood reconstruction computational process.

In yet a further embodiment of the system, the canonical image data output is used in a texture mapping computational process to render the observer view of the simulated light field display.

In yet another embodiment of the system, the rendered observer view of the simulated light field display is viewed using a head-mounted display device.

In still another embodiment of the system, the head-mounted display device is a virtual reality viewing device.

In a further embodiment of the system, the head-mounted display device is an augmented reality viewing device.

In yet a further embodiment of the system, the steps a) to c) are repeated changing the information for the observer location to provide for the evaluation of multiple observer views of the simulated light field display.

BRIEF DESCRIPTION OF THE DRAWINGS

The application file contains at least one drawing executed in color. Copies of this patent or patent application publication with color drawing will be provided by the Office upon request and payment of the necessary fee. These and other features of the invention will become more apparent in the following detailed description in which reference is made to the appended drawings.

DETAILED DESCRIPTION OF THE INVENTION

Figure 1:
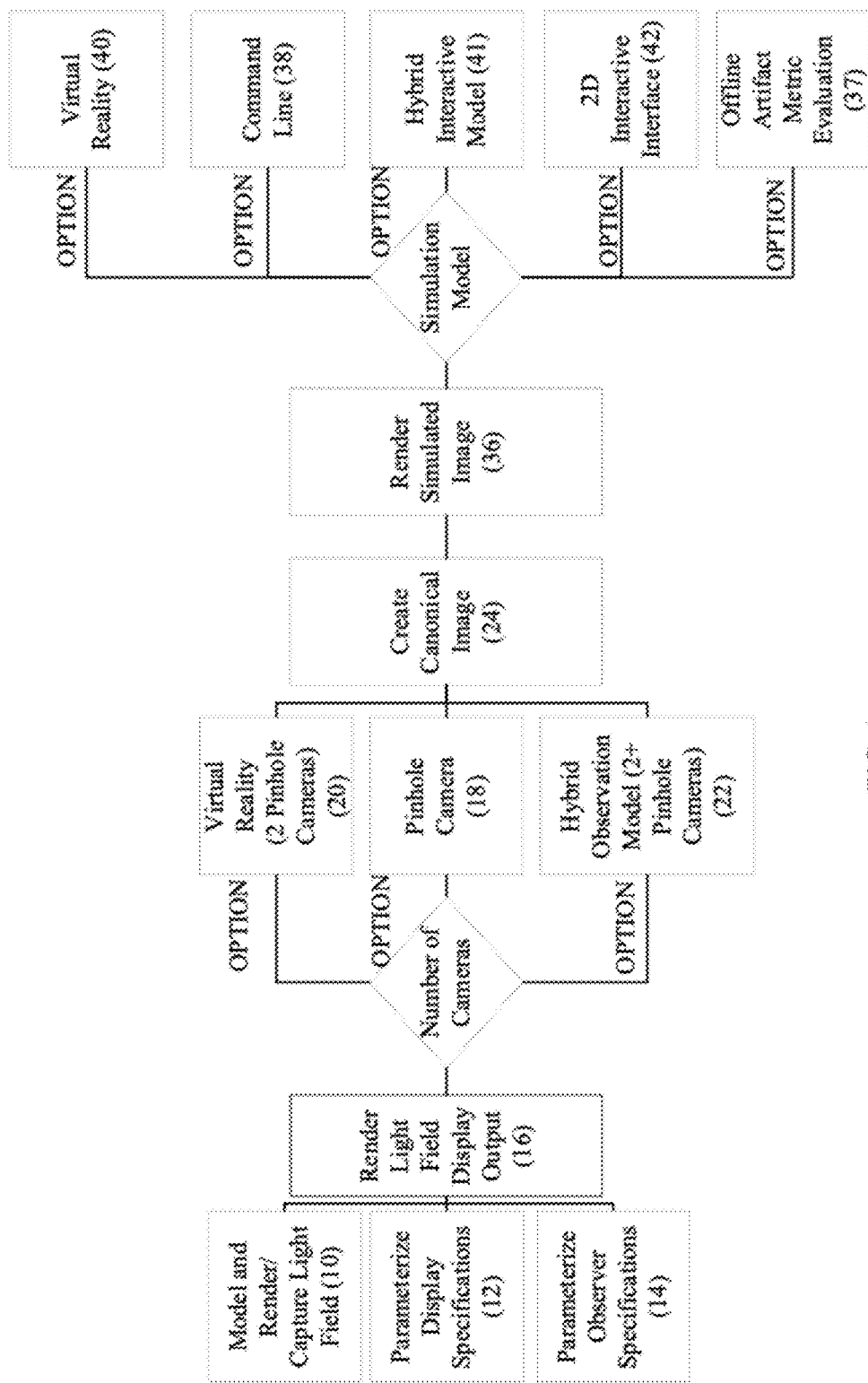
FIG. 1: is a process flow for the light field display simulation.

The present invention relates generally to light field display systems and computer-aided design methods for simulating a virtual observer's view(s) of a light field as displayed by simulated virtual light field displays for the purposes of evaluating display parameters, such as spatial and directional resolution, and assessing their effect on perceived quality of light field content.

The method disclosed herein seeks to ameliorate the performance issues plaguing the prior art by introducing a method to simulate observer views using an intermediate (canonical) image generation process. Using a ray intersection procedure to create a canonical image, this method provides light field display designers with a method for effectively and efficiently designing light field displays before committing time, money and resources to constructing the physical models. Additionally, this method allows for the rapid exploration and even real-time interactivity with virtual light field displays and light field display content, and as such, the method of the disclosure (as may be embodied in exemplary applications of the invention) can benefit light field content creators who may not have access to the expensive light field displays for which they are designing content.

Various features of the method will become apparent from the following detailed description taken together with the illustrations in the Figures. The method procedure, design parameters and use of light field display simulator disclosed herein are described with reference to various examples representing embodiments which are not intended to limit the scope of the invention as described and claimed herein. The skilled technician in the field to which the invention pertains will appreciate that there may be other variations, examples and embodiments of the method not disclosed herein that may be practiced according to the teachings of the present disclosure without departing from the scope and spirit of the invention.

Definitions

Unless defined otherwise, all technical and scientific terms used herein have the same meaning as commonly understood by one of ordinary skill in the art to which this invention pertains.

The use of the word "a" or "an" when used herein in conjunction with the term "comprising" may mean "one," but it is also consistent with the meaning of "one or more," "at least one" and "one or more than one."

As used herein, the terms "comprising," "having," "including" and "containing," and grammatical variations thereof, are inclusive or open-ended and do not exclude additional, unrecited elements and/or method steps. The term "consisting essentially of" when used herein in connection with a composition, device, article, system, use or method, denotes that additional elements and/or method steps may be present, but that these additions do not materially affect the manner in which the recited composition, device, article, system, method or use functions. The term "consisting of" when used herein in connection with a composition, device, article, system, use or method, excludes the presence of additional elements and/or method steps. A composition, device, article, system, use or method described herein as comprising certain elements and/or steps may also, in certain embodiments consist essentially of those elements and/or steps, and in other embodiments consist of those elements and/or steps, whether or not these embodiments are specifically referred to.

As used herein, the term "about" refers to an approximately +/−10% variation from a given value. It is to be understood that such a variation is always included in any given value provided herein, whether it is specifically referred to.

The use of any examples or exemplary language, e.g. "such as", "exemplary embodiment", "illustrative embodiment" and "for example" is intended to illustrate or denote aspects, embodiments, variations, elements or features relating to the invention and not intended to limit the scope of the invention.

As used herein, the terms "connect" and "connected" refer to any direct or indirect physical association between elements or features of the present disclosure. Accordingly, these terms may be understood to denote elements or features that are partly or completely contained within one another, attached, coupled, disposed on, joined together, in communication with, operatively associated with, etc., even if there are other elements or features intervening between the elements or features described as being connected.

As used herein, the term "arbitrary" refers to the selection of values that carry with them no particular significance. This term is useful in demonstrating that when parameterizing inputs for the simulator, values can be chosen that do not carry with them any unique meaning and is illustrative of the seemingly infinite number of parameterizations available when tailoring the simulation.

As used herein, the term "pixel" refers to a light source and light emission mechanism that emits RGB light rays used to create a display. When referred to in the context of different display systems (e.g. 2D versus 3D), different pixel configurations are contemplated as would be understood by one skilled in the art. For example, in the present disclosure, the concept of a "pixel" in the context of a 3D display is generally more usefully framed as a "hogel pixel"—Refer to Klug's "A Scalable, Collaborative, Interactive Light-field Display System" [13].

As used herein, the term "hogel" is a cluster or array of individual pixels (hogel pixels) or light sources with directional control (whether that be through a refractive lens, individual angular pixel control, or another method as would be known to one skilled in the art), which, when tiled in an array, can generate a multi-view, directional light field. Similar to how a single pixel is the building block of a 2D display, the hogel is the building block for a 3D light field display. In keeping with the standard terminology of the field, hogels can also be referred to as "directional pixels," "holopixels," or "holographic pixels"—Refer to Klug's "A Scalable, Collaborative, Interactive Light-field Display System" [13].

As used herein, the term "texturing" or "texture mapping" is a method for defining high frequency detail, surface texture, or colour information on a computer-generated graphic or 3D model. Its application to 3D graphics was pioneered by Edwin Catmull in 1974 [3]. Further reference can be found in "A subdivision algorithm for computer display of curved surfaces—" as included in the reference list of this disclosure.

As used herein, the term "light field" at a fundamental level refers to a function describing the amount of light flowing in every direction through points in space, free of occlusions. Therefore, a light field represents radiance as a function of position and direction of light in free space. A light field can be synthetically generated through various rendering processes or may be captured from a light field camera or from an array of light field cameras.

As used herein, the term "ray intersection" is the four-dimensional point-of-contact $(x,y,\theta,\phi)$ of a ray cast from the observer location with a hogel. Alternatively, the ray intersection can be the four-dimensional intersect between the ray cast from the hogel with the observer location. The ray intersection is used to calculate and create a canonical image.

As used herein, the term "intermediate image" is synonymous and interchangeable with the term "canonical image." It derives its meaning from its place in the process of simulating a light field display; it is the image created using the primary inputs (light field data, light field display specification and observer parameters) and then applied/displayed on the simulated light field display. The intermediate image is a means of representing all this data on the simulated light field display. The intermediate image can be prepared according to the present disclosure using a ray intersection procedure as disclosed herein.

As used herein, the term "light field display" is a device which uses an array of directional pixels to replicate a natural, "real-life" image. The image displayed will appear to exist in three dimensions, an experience similar to that of peering out a window with the display plane acting as the window frame. A light field display reconstructs a light field from a finite number of light field radiance samples input to the device. The radiance samples represent the color components red, green and blue (RGB). For reconstruction in a light field display, a light field can also be understood as a mapping from a four-dimensional space to a single RGB color. The four dimensions include the vertical and horizontal dimensions of the display and two dimensions describing the directional components of the light field. That is to say, the light field display casts RGB light rays outwards in a parameterized field-of-view towards the observer(s). A light field (LF) is defined as the function:

$$LF:(x,y,u,v) \to (r,g,b)$$

For a fixed $x_f, y_f$, $LF(x_f, y_f, u, v)$ represents a two-dimensional (2D) image referred to as an "elemental image". The elemental image is a directional image of the light field from the fixed $x_f, y_f$ position. When a plurality of elemental images are connected side by side, the resulting image is referred to as an "integral image". The integral image can be understood as the light field image, constructed of a finite number of elemental images, with each elemental image corresponding to a discrete position and direction relative to the display. A light field display as described herein is not limited to a flat display device; other iterations of curved and flexible displays can exist.

As used herein, "structural similarity" (SSIM) metric is a method for predicting the perceived quality of digital television and cinematic pictures, as well as other kinds of digital images and videos [19].

It is contemplated that any embodiment of the systems and methods and uses disclosed herein can be implemented by one skilled in the art, as is, or by making such variations or equivalents without departing from the scope and spirit of the invention.

Light Field Display Simulation Systems and Methods

The light field display computer implemented simulation method according to the present disclosure applies the novel intermediate canonical image generation process for the purposes of facilitating efficient simulation of a virtual observer(s) and simulated light field display(s) as disclosed herein, including its derivation, implementation and applications.

3D Displays

The simulation method, which is the subject of the present disclosure, is designed to simulate and aid in evaluating 3D light field displays. A conventional two-dimensional display as previously known in the art consists of spatial pixels substantially evenly-spaced and organized in a two-dimensional array, allowing for an idealized uniform sampling. By contrast, a three-dimensional display requires both spatial and angular samples. While the spatial sampling of a typical three-dimensional display remains uniform, the angular samples cannot necessarily be considered uniform in terms of the display's footprint in angular space. For a review of various light field parameterizations for angular ray distributions, see U.S. Pat. No. 6,549,308.

The angular samples, also known as directional components of the light field, can be parameterized in various ways, such as the planar parameterizations taught by Gortler et. al in "*The Lumigraph*" [7]. When the light field function is discretized in terms of position, the light field can be understood as a regularly-spaced array of planar-parameterized pinhole projectors, as taught by Chai in "*Plenoptic Sampling*" [4]. For a fixed $x_f, y_f$, the elemental image, $LF(x_f, y_f, u, v)$ represents a two-dimensional image which may be understood as an image projected by a pinhole projector with an arbitrary ray parameterization. For a light field display, the continuous elemental image is represented by a finite number of light field radiance samples. For an idealized, planar parameterized pinhole projector, said finite number of samples are mapped into the image plane as a regularly-spaced array (the regular spacing within the plane does not correspond to a regular spacing in the corresponding angular directional space).

The consideration of planar parameterizations is not intended to limit the scope or spirit of the present disclosure, as the directional components of the light field can be parameterized by a variety of other arbitrary parameterizations. For example, lens distortions or other optical effects in a physically embodied pinhole projector can be modeled as distortions of the planar parameterization. In addition, display components may be defined through a warping function, such as taught by Clark et al. in "*A transformation method for the reconstruction of functions from nonuniformly spaced samples*" [5].

A warping function $\alpha(u,v)$ defines a distorted planar parameterization of the pinhole projector, producing alternate angular distributions of directional rays in the light field. The angular distribution of rays propagating from a light field pinhole projector is determined by the pinhole projector's focal length f and a corresponding two-dimensional warping function α(u,v).

Figure 3:
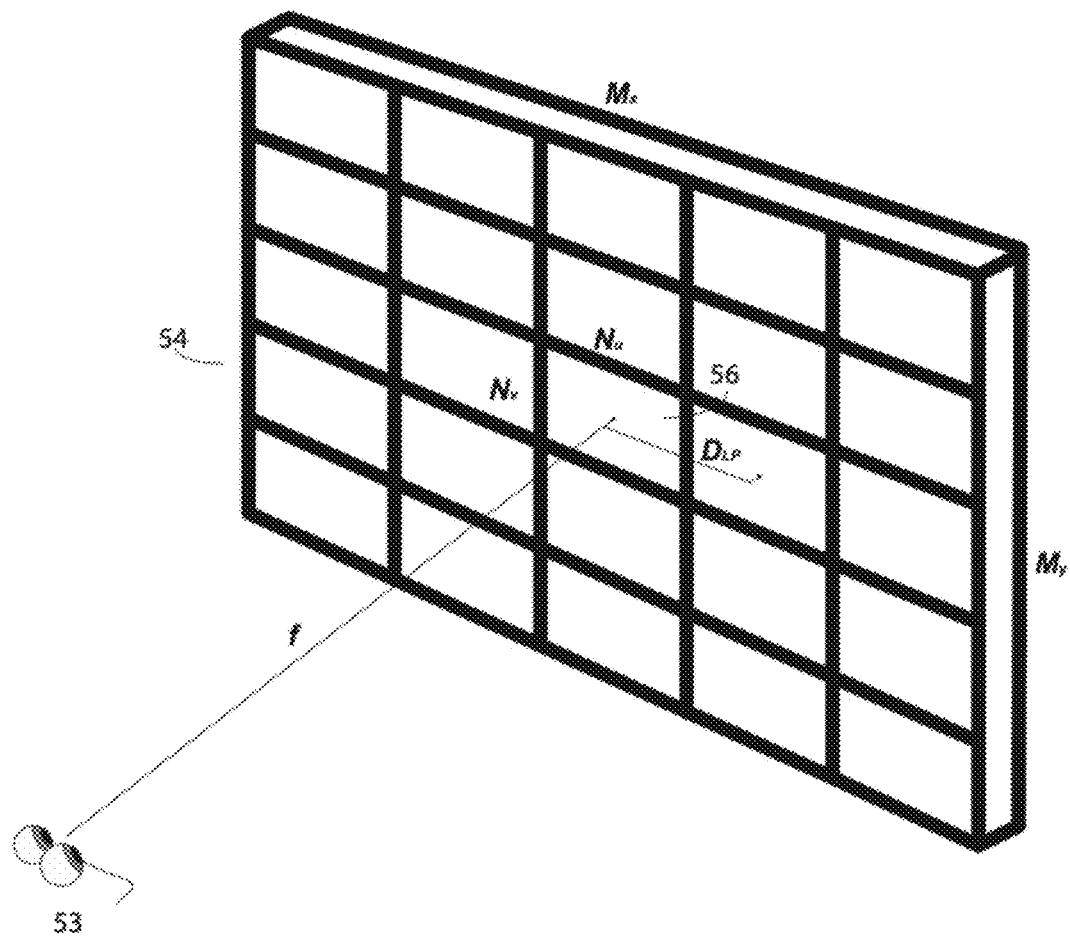
FIG. 3: illustrates the different display parameters of the light field display, $D=M_x, M_y, N_u, N_v, f, \alpha, D_{LP}$.

An autostereoscopic light field display that projects a light field for one or more users which is defined as:

$$D=(M_x,M_y,N_u,N_v,f,\alpha,D_{LP})$$

Where $(M_x,M_y)$ are the horizontal and vertical dimensions of the display's spatial resolution and $(N_u,N_v)$ are the horizontal and vertical dimensions of the display's directional resolution components. The display is an array of idealized hogels, with pitch $D_{LP}$, focal length f which determines the Field-of-View (FoV) of the display, and a warping function α defining the distribution of ray directions for the light field projected by the display. Refer to FIG. 3 for an illustrative embodiment.

An observer, $O=(X_O,D_O,f_O)$ is defined as a pinhole camera imaging a display with parameters being focal length $f_O$, with focal point located at $X_O$ and pointing in direction $D_O$, where $D_O$ is a 3D vector. For observer O, the observer image is denoted as $I_O$. For virtual reality viewing, two observers with separate $X_O$ and $D_O$ must be calculated to account for the disparity between the observer's eyes.

Light Field Display Rendering

In "*Fast computer graphics rendering for full parallax spatial displays*," Halle et al. [8] provide a method for rendering objects located within an inner frustum volume and outer frustum volume of the display. Halle et al. [8] teach a double frustum rendering technique, where the inner frustum volume and outer frustum volume are separately rendered as two distinct light fields. The inner frustum volume $LF_O(x,y,u,v)$ and outer frustum $LF_p(x,y,u,v)$ volume are recombined into a single light field through a depth merging process. Reference FIG. 2B.

The technique uses a pinhole camera rendering model to generate the individual elemental images of the light field. Each elemental image (i.e. each rendered planar-parameterized pinhole projector image) requires the use of two cameras: one camera to capture the inner frustum volume and one camera to capture the outer frustum. Halle et al. [8] teach rendering a pinhole projector image at a sampling region of the light field using a standard orthoscopic camera and its conjugate pseudoscopic camera. For a pinhole camera C, the corresponding conjugate camera is denoted as C*. These cameras, in conjunction, can be conceptualized as a double frustum light field camera.

To capture an elemental image within a light field display with projectors parameterized using warping function α, a generalized pinhole camera based on a re-parameterization of an idealized planarly-parameterized pinhole camera is used. As taught by Gortler et al. [7], a pinhole camera C with a focal length f has light rays defined by a parameterization created by two parallel planes. Pinhole camera C captures an image $I_C(u,v)$, where (u,v) are coordinates in the ray parameterization plane. The generalized pinhole camera, $C_\alpha$, is based upon a planar parameterized camera warped using a two-dimensional, continuous, invertible time-warping function, as taught by Clark et al [5]. With a warping function α(u,v) the inverse is γ(u,v). Therefore, the image of $C_\alpha, I_{C\alpha}=I_C(\alpha(u,v))$.

Given the generalized pinhole camera, $C_\alpha$, a conjugate generalized camera $C_\alpha^*$ is formed to complete double frustum rendering. The views generated from a $M_x \times M_y$ grid of generalized pinhole camera pairs is rendered to render the light field for the light field display.

Therefore, the set of all generalized pinhole camera pairs that must be rendered to produce light field LF(x,y,u,v) for a given light field display $D=(M_x,M_y,N_u,N_v,f,\alpha,D_{LP})$ is defined as:

$$\{(C_\alpha,C_\alpha^*)(x,y)|1\leq x\leq M_x, 1\leq y\leq M_y\}$$

A set of orthoscopic cameras $(O=\{(C_\alpha(x,y)|1\leq x\leq M_x, 1\leq y\leq M_y\})$ capture the light field image corresponding to the inner frustum volume and a set of conjugate generalized cameras $(P=\{(C_\alpha^*(x,y)|1\leq x\leq M_x,1\leq y\leq M_y\})$ capture the image corresponding to the outer frustum volume. As described above, the inner frustum volume and outer frustum volume are combined into a single light field.

Canonical Image Generation Process

A canonical image can be understood as an array of RGB values corresponding to light rays which have or are representative of two endpoints: one end at a hogel on a light field display and the other at an observer location. Each hogel pixel light ray in the hogel is directed in its own discrete direction. The light ray intersects with other light rays—emitted by other hogel pixels—from other hogels at a point on a viewing plane determined by the construction of the display. The culmination of these light rays at one point defines the canonical image. Due to the nature of a light field display, there will be a canonical image light ray that corresponds with every hogel in the display and the observer. Each canonical image will be a two-dimensional rasterized image—or another similar method such as ray-traced—that corresponds to its respective observer location. In other words, the canonical image will change depending upon the location of the observer.

As described above, a canonical image Canon(x,y) contains one pixel for each hogel (H) in the light field display. Each hogel coordinate H(x,y) of the display $D(M_x,M_y)$ maps on to the corresponding (x,y) of the canonical image. Supposing $D=(M_x,M_y,N_u,N_v,f,\alpha,D_{LP})$ and $O=(X_O,D_O,f_O)$ i.e. the display parameters and observer specifications, the set of rays, one for each hogel associated with D, is defined by the line that connects $X_O$ and the centre of each hogel. Let $X_{ij}^c$ denote the center of $H_{ij}$ and then define the set of lines $\{\overline{X_OX_{ij}^c}|1\leq i\leq M_x,1\leq j\leq M_y\}$ as the set of canonical rays of observer O relative to display D. It is also possible to define canonical rays that do not strictly intersect the centre of each hogel, but possibly other intersection points which may not necessarily be the same for each hogel.

For any canonical ray $\overline{X_OX_{ij}^C}$, there is an angular $(\theta_{ij},\phi_{ij})$ pair that represents the spherical coordinates of the vector associated with $\overline{X_OX_{ij}^C}$. Each of the $N_u \times N_v$ elements of $H_{ij}(u,v)$ also has a spherical coordinate representation which we can write $(\theta(u),\phi(v))$ as well as a spatial vector representation which we denote as $\overline{P_{u,v}}$. The canonical rays for a given display and observer sample radiant intensity values from the light field projected by the display hogels. These intensity values form a $M_x$ by $M_y$ image, which is referred to hereto as the canonical image $(I_C)$ relative to display D and observer O; this image is denoted as $I_C[D, O](x,y)$ or Canon(x,y).

The canonical image generation process' use is not limited by the pinhole observer model described above. Alternatively, one can define a generalized canonical image (based on a finite aperture observer) as a set of rays whose endpoints are the function of the aperture size and position and the location of the hogel. Instead of one canonical ray per observer (as in the pinhole camera model), a set of canonical rays would be generated per hogel. Based on the focal plane of the finite aperture camera, these generalized canonical ray sets would be combined into a canonical image by forming image pixels values that are the sum of multiple rays, as typical for a finite aperture camera.

The method of the present disclosure has key differences between those methods described in the prior art. As opposed to CN Patent No. 107563088A, which is based on a ray tracing algorithm, the method described herein, which is agnostic of specific display optics, generates an intermediate observer image using a ray intersection procedure, where a final pinhole observer image can be generated easily by either rasterization or ray tracing techniques.

The method described in Levoy [14] suggests exploiting hardware-based polygon scan conversion in order to compute a pinhole observer view of a light field projection surface (which could be seen to represent a display and thus form a type of display simulation method). This method scan converts (rasterizes) a (u,v) plane and a (s,t) plane onto to the observer (x,y) plane. If the resulting (x,y) observer plane is of high resolution and the planes project onto a significant portion of the observer plane, this will result in the requirement for a large number of texture lookups and reconstruction computations required from the input light field data. These reconstructions can become more significantly computationally intensive, especially for the point-spread function-based reconstructions.

In contrast to the method described in Levoy [14], a canonical image-based method limits the number of light field image reconstruction lookups per simulated observer view to the spatial resolution of the light field display. To put in other words, there is one reconstruction calculation per hogel in the display. For light field displays with relatively smaller (e.g. 640×360) spatial resolutions (typical at this time), the resulting canonical image is much smaller than a large observer image (e.g. 4000×4000 pixels). Thus, the number of reconstructions required for generating a canonical image can be much less than if one follows the Levoy method [14], which can result in performing a reconstruction for each pixel in the observer image in the worse case.

In typical good practice, one wants the observer view in the simulation to be of high enough resolution that its sampling rate is not a limiting factor in how the light field display and its associated quality are simulated to be perceived. In cases where the observer images' resolution is sufficiently low, it can be observed that increasing a display's spatial resolution (while maintaining display size and directional resolution) results in little to no observable change in display quality, as the observer images' resolution itself becomes a limiting factor. This phenomenon was observed while using a current virtual reality (VR) headset for observer images, as the resolution for an Oculus Rift is 1080×1200. In the near-eye, VR display setting, it is known that the human eye can perceive much higher resolutions than 1080×1200 and much higher pixel density VR displays are being developed to meet this need. These will no doubt be commercially available as consumer items in the near future, as predicted by Vieri et al. [17]. Thus, the need to produce very high-resolution observer images at high frame rates is key for making an effective 3D display simulator that works with a VR display.

Canonical images can be designed to have a certain variation of quality to be able to prioritize efficiency of simulation generation versus quality/resolution of the canonical image in other contexts. Quality reduction or introduction of artifacts of various sorts into a canonical image may be an acceptable trade-off if the quality reduction results in a computational performance/throughput gain i.e. faster simulating process. Canonical images with quality reduction, for example, when using the nearest neighbour reconstruction method, can still be highly useful if they result in simulated observer views which still preserve some key aspects of a 3D display. An example of this is that minor image aberrations in the simulated observer image may be tolerable if the purpose of the simulation is to determine degradation of objects at depth, due to the depth of field of a display [18]. Ultimately, it is the objective of the simulation that determines which canonical image reconstruction model is appropriate. A strength of our simulation method is in its flexibility, being able to choose the canonical image reconstruction model that best serves the desired simulation.

The Nearest Neighbour Reconstruction Model

One way to create a canonical image according to the present disclosure is to apply the nearest neighbour reconstruction model. The nearest neighbour reconstruction model considers a ray from a canonical image corresponding to the radiant intensity value $I_C[D, O](x,y)$ for some i,j The model supposes the ray vector $\overline{X_O X_{ij}}^C$ can be represented in spherical coordinates as $(\theta_{ij}, \phi_{ij})$. Let:

$$(u_n^{ij}, v_n^{ij}) = \operatorname{argmin}_{u,v} \arccos(\overline{X_O X_{ij}}^C \cdot \overline{P_{u,v}})$$

The indices $(u_n^{ij}, v_n^{ij})$ represent the hogel pixel which has minimum angular distance from the sampling canonical ray. Thus, by this nearest neighbour interpolation, the result is:

$$I_C[D,O](i,j) = H_{ij}(u_n^{ij}, v_n^{ij})$$

This leads to a less physically accurate light field display output however its simplicity is useful in quickly generating canonical images for simulation. Additionally, the less-accurate light field reconstruction model can be more easily simulated for real-time exploration of the light field display in virtual reality.

Point Spread Function Based Reconstruction Model

Another way to create the canonical image is by employing the point spread function-based reconstruction model. To create a more physically accurate display simulation and better account for how multiple directional samples within a hogel can potentially exhibit light leakage, it is possible to use a point-spread-function-based reconstruction method. If a Gaussian based function is used, the angular width of the point spread function for each hogel can be manually specified through $\sigma(u,v)$ for each directional pair (u,v):

$$G_{ij}(\theta, \phi, \sigma(u, v)) = e^{\frac{-D_G[(\theta,\phi),(\theta_{ij},\phi_{ij})]}{2\sigma(u,v)}}$$

Where $D_G$ represents the central angle of the chord great-circle of the unit sphere denied between the points $(\theta,\phi)$ and $(\theta_{ij},\phi_{ij})$. In other words, the shortest circumferential distance between points $(\theta,\phi)$ and $(\theta_{ij},\phi_{ij})$. This model can employ other point-spread functions and is not limited by the Gaussian function disclosed herein.

In contrast to the nearest neighbour reconstruction model, the point-spread-function-based method reconstructs the radiant intensity based on a normalized weighted sum of intensities of neighboring directional pixel intensities, instead of just the nearest intensity:

$$I_C[D, O](i, j) = \frac{\sum_{u,v} H_{ij}(u, v) G_{ij}(\theta(u), \phi(v), \sigma(u, v))}{\sum_{u,v} G_{ij}(\theta(u), \phi(v), \sigma(u, v))}$$

The point spread reconstruction method is not limited to the Gaussian function formulated above. Other formulations of the function are employable, and the above formulation should be interpreted as an exemplary embodiment of the method.

The point-spread function canonical image reconstruction method can be implemented using a fixed-size window. With a fixed-sized window, as opposed to a full-sized window (above), the canonical image reconstruction method will only sample those hogel pixel within a fixed-size window that will have any measurable overlap with another hogel pixel. In practice, this effective support will determine the number of neighboring pixels that must be included in a reconstruction summation. This is a well-known practice in the art [15]. Based on knowing the support of the point spread functions provided, one can choose K (a window size dimension parameter) such that the smaller, approximate summation will produce very similar results to the full window summation. Reducing the number of hogels considered when creating the canonical image greatly reduces the computational time, effectively making the point-spread function-based reconstruction model compatible with real-time VR viewing.

Incorporating Display Calibration Data

We may calibrate the light field simulation model to a real display, as an attempt to maximize the predictive capabilities of the simulator. In terms of the simulation model we describe here, we can incorporate display calibration through two main ways (though not strictly limited to these): (1) point spread function (both function itself and its parameters) and (2) principal direction. In an embodied light field display, each addressable directional sub-pixel within a hogel has a principal direction of emission, along with a point spread function which describes how pixel intensity is distributed in all directions including the principal one. Typically, the point spread function is defined in terms of this principal direction and may in fact be centred on this principle direction (but not necessarily). As described above, a Gaussian function is provided as a possible point spread function. The σ(u,v) can be set to control the width of this Gaussian function. Similarly, $(\theta_{i,j}, \phi_{i,j})$ represents the centre or mean of the Gaussian and its principal direction.

In practice, such calibration information would be provided to the simulator in the form of a tables or parameterized functions. Following the above examples, a table of $(\theta_{i,j}, \phi_{i,j})$ pairs, with one pair for each RGB hogel pixel and a distinct table for each hogel could be provided to define the principal directions for the entire simulated display. Similarly, a table of values for σ(u,v) defined for each hogel and each (u,v) within the hogel could be given to describe the point spread function widths for an entire display. In this way, the simulated display could be made to have similar characteristics to an actual display in terms of artifacts, inherent resolution limitation, etc.

Generalized and Illustrative Embodiment—Simulator Implementation and Application Overview The present disclosure defines a light field display simulator for the exploration of display quality, including, but not limited to, display parameters, observer location, light field content and light field reconstruction method. This generalized and illustrative embodiment can be used to design, optimize and explore current and future light field display technologies. A generalized and illustrative embodiment of the present disclosure provides a method to render light field content for display on a simulated light field display for quality evaluation. The generalized and illustrative embodiment can be optimized by implementing different canonical image reconstruction models to tailor the canonical image quality and simulation speed to the purposes of the simulation.

FIG. 1 describes an exemplary embodiment for implementing a simulation model that can be used for the visualization of light field displays in a real-time fashion. A light field is modeled and rendered or captured using plenoptic cameras or another hybrid light field capture method (10). The light field display parameters (12) and the observer parameters (14) are input to render a light field display output (16). A pinhole camera (18), two pinhole cameras parameterized for virtual reality viewing (20), or another hybrid observation model (22) is then chosen to determine how many canonical images must be generated. The canonical image(s) is/are created (24) and the simulated observer radiance image using the canonical image as a texture for a plane which represents the simulated light field display is rendered (36). A simulated viewer can view the simulated light field display in a variety of ways including but not limited to command line mode (38), virtual reality (40), viewing on a 2D interactive interface (42), offline for artifact metric evaluation (37) or any other combination of the aforementioned or hybrid method of interactivity (41) not otherwise specifically outlined herein.

Implementation

Figure 2A:
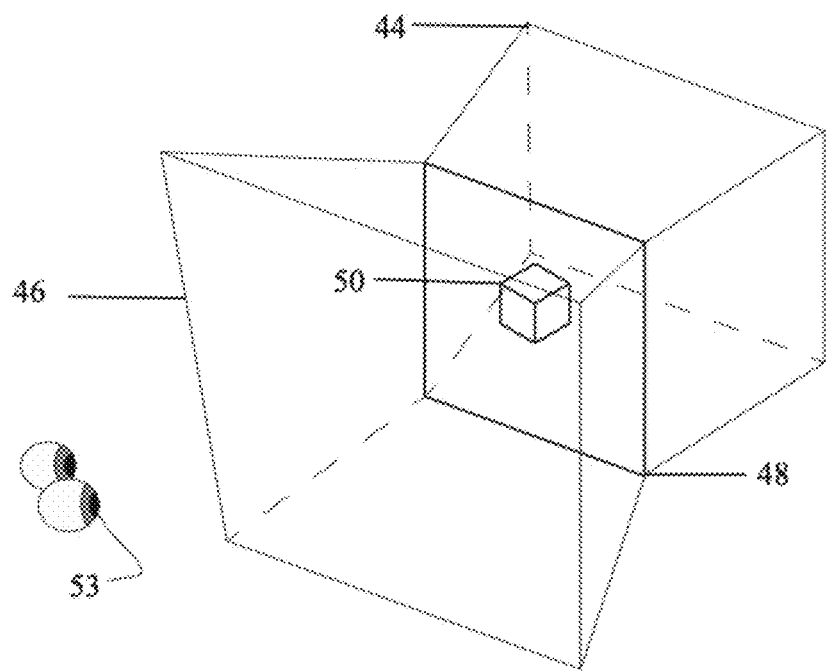
FIG. 2A: illustrates an isometric modeling of a 3D scene using a multi-camera capture method.
Figure 2B:
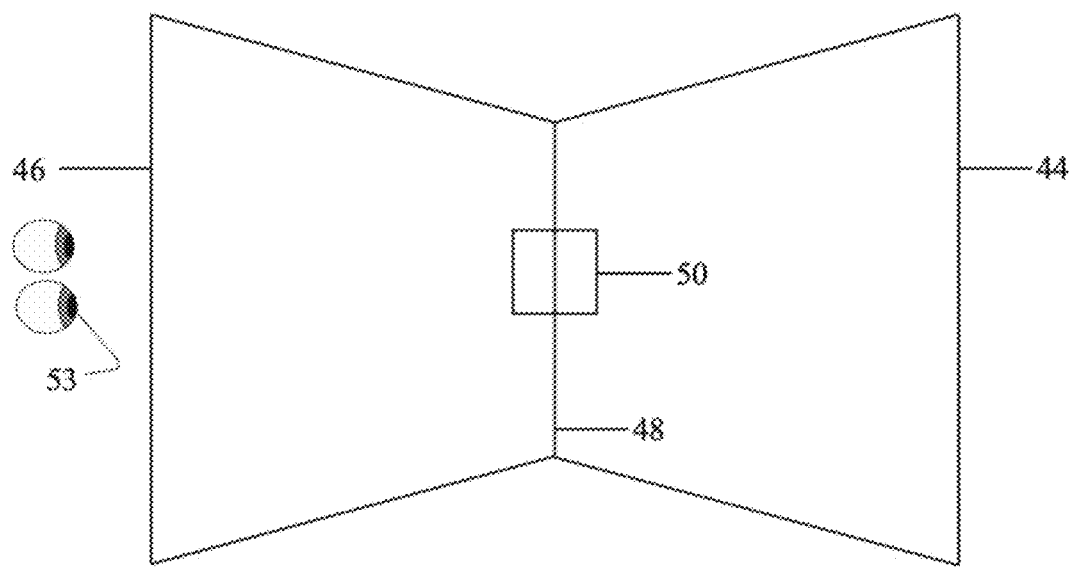
FIG. 2B: is an overhead illustration of the 3D scene of FIG. 2A.

A manner for implementing the light field display simulation method begins with a 3D model input to be rendered to a light field image to be shown on the simulated display. FIG. 2A illustrates a light field display representing objects within a volumetric region defined by these two separate viewing frusta, with the inner frustum volume (44) located behind the display surface (48) (i.e., within the display) and the outer frustum volume (46) located in front of the display surface (i.e. outside of the display). As illustrated, a cube (50) traversing the display plane is located partially in the outer frustum volume with the not-represented other portion in the inner frustum as viewed by an observer (53). The cube, display plane and frusta are all modeled and parameterized within a computer modeling software and then captured using an array of double-frustum light field cameras. These cameras are located on the display plane and capture the relevant spatial, angular and textural information of the rendered objects i.e. the cube within the frusta. This illustrative example uses a modified Unreal Engine 4™ developed by Epic Games with an added light field rendering capability developed in-house, to model and render the light field. The light field rendering capability allows Unreal Engine 4™ to render a three-dimensional scene i.e. light field and capture the scene using a double frustum camera. The double frustum camera location will be located where the designer of the scene wishes to have the light field display surface relative to the three-dimensional scene. Thus, the frusta of the light field display will originate from the location of the double frustum cameras on the light field display. This light field data will then be input for the canonical image generation process. The method with which the 3D model is captured, modeled or rendered is not limiting for the purposes of the present disclosure and methods of the invention. An exemplary alternative to this method includes 3D model capture using one or multiple plenoptic cameras. FIG. 2B is a top-down illustrative example of the aforementioned light field display.

FIG. 3 illustrates an autostereoscopic light field display (54), made up of an array of hogels (56), that projects a light field for one or more observers (53). The display is defined as:

$$D=(M_x, M_y, N_u, N_v, f, \alpha, D_{LP})$$

These display parameters will be used as input for the light field display simulation. To test light field displays and the quality of light field content on such displays, it is self-evident that the specifications of the display are required. For clarity, the observer in this illustration is viewing a ray omitted by a single hogel. In a true light field display, the observer would be receiving rays from each hogel. This illustration is for the illustrative purposes of conceptualizing a light field display and its respective parameters.

Depending on the simulated observer model desired during the simulation, the observer parameters (14) can be specified before rendering the light field output (16) (FIG. 1). An illustrative example of this is placing the observer at different positions to test the simulated light field display's effective viewing range. Alternatively, the observer specifications can also be specified and adjusted later in the simulation method every time the observer's position in the simulation is transformed i.e. virtual reality interactivity.

To determine how many canonical images must be created, it is necessary that one specify the observer model that will be employed during the simulation. The number of canonical images required for the simulation is dependent on the virtual observer model used when viewing the simulated light field display. The pinhole model will require at least one canonical image. A virtual reality system, such as the Oculus Rift™, uses at least two discrete pinhole cameras and require at least two canonical images respectively. The number of canonical images created will correspond directly with the observer model used during the simulation.

Figure 4A:
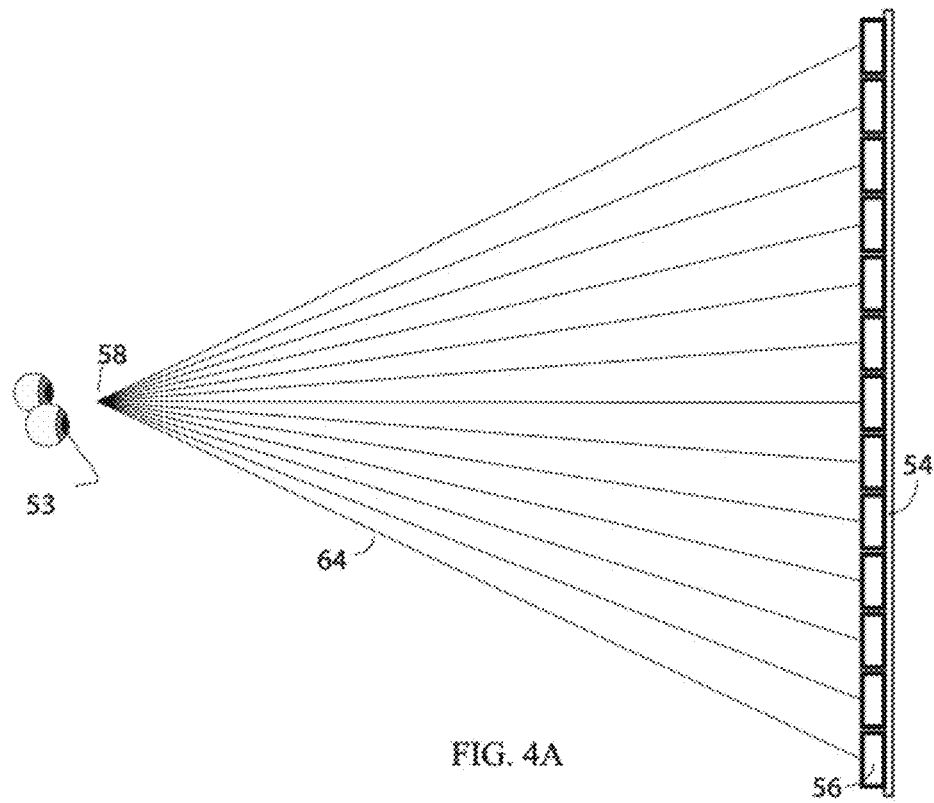
FIG. 4A: is a schematic top-down view of the canonical image generation process for each (x,y) hogel.

FIG. 4A uses the light field data to be displayed on the simulated display i.e. the 3D model input, the display parameter specifications and the observer's position, direction and model to calculate the canonical image (58) traced from observer position $X_O$ (53) to the center of every hogel (56) in the display D (54). The canonical image is composed of an array of the individual canonical rays (64) that are traced from the observer position to the center of each individual hogel. We assume that hogels are physically indivisible in some sense. In reality, this would not likely be absolutely the case in an embodied 3D display. However, for the demonstrative purposes of this exemplary illustration, the rays can be understood as being traced from the observer location to the center of each hogel and should not be viewed as limiting the scope of the patent.

Figure 9:
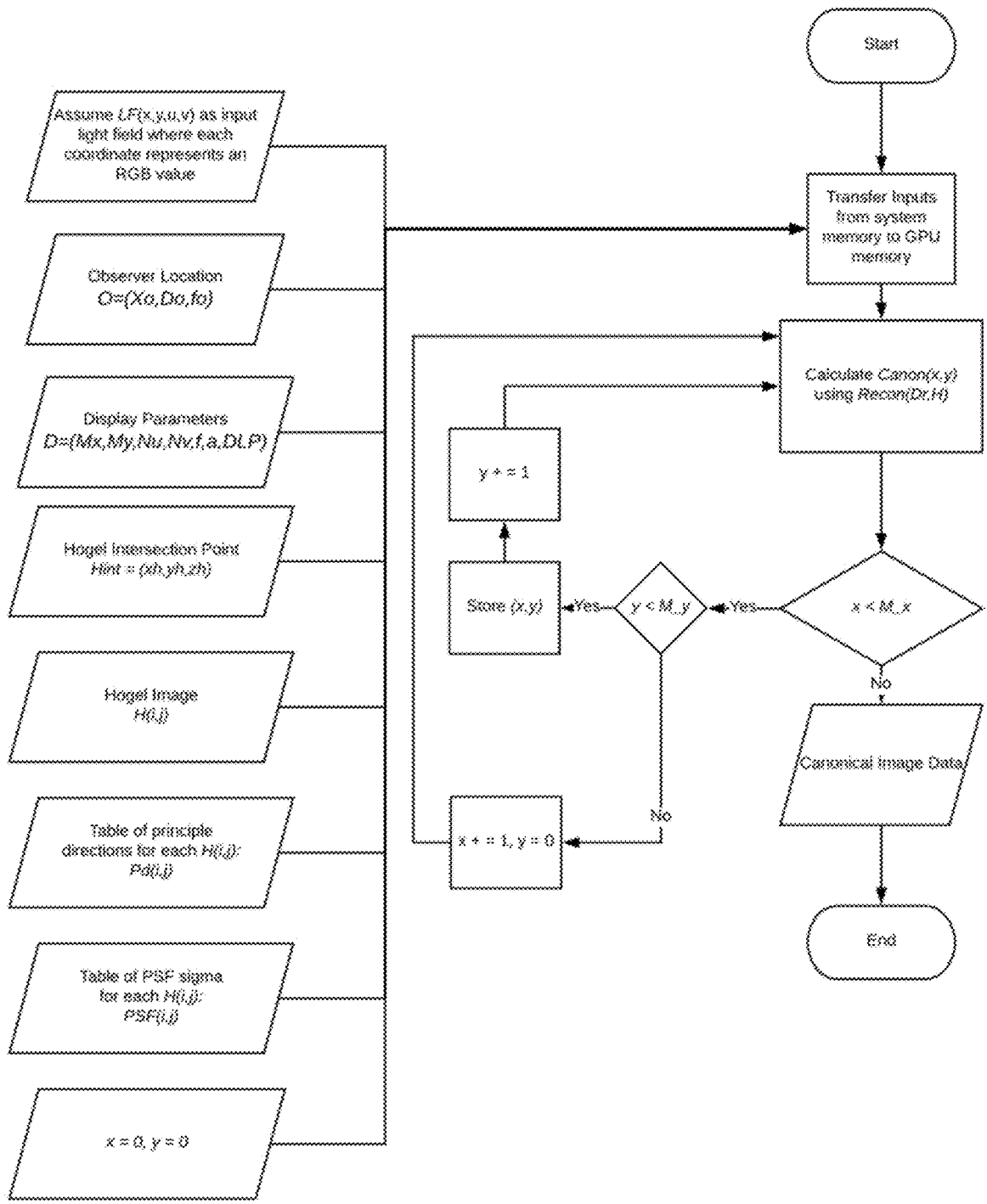
FIG. 9: an exemplary embodiment of the canonical image data generation process.
Figure 10:
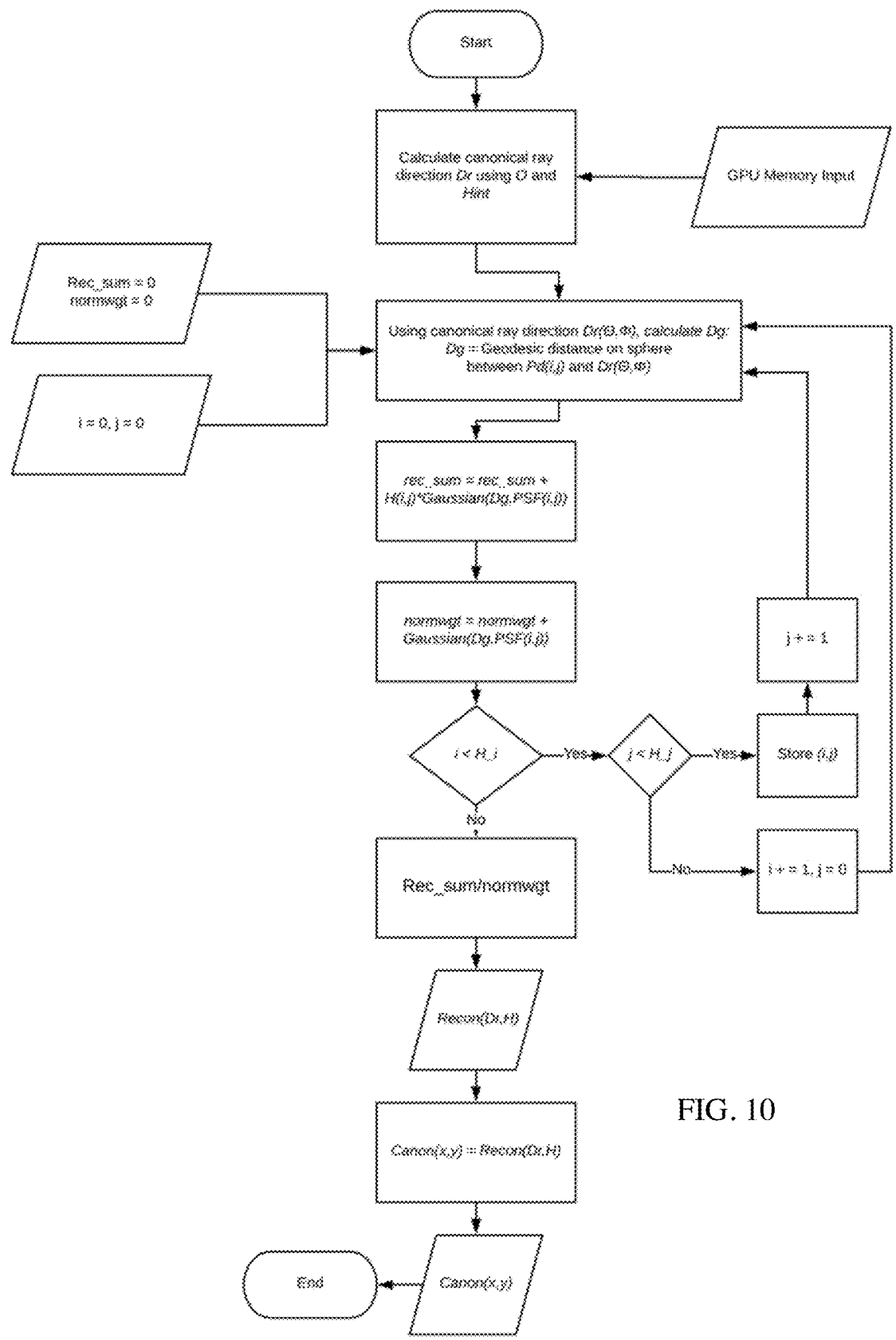
FIG. 10: an exemplary embodiment of the point-spread function canonical image reconstruction method using planar parameterization.
Figure 13:
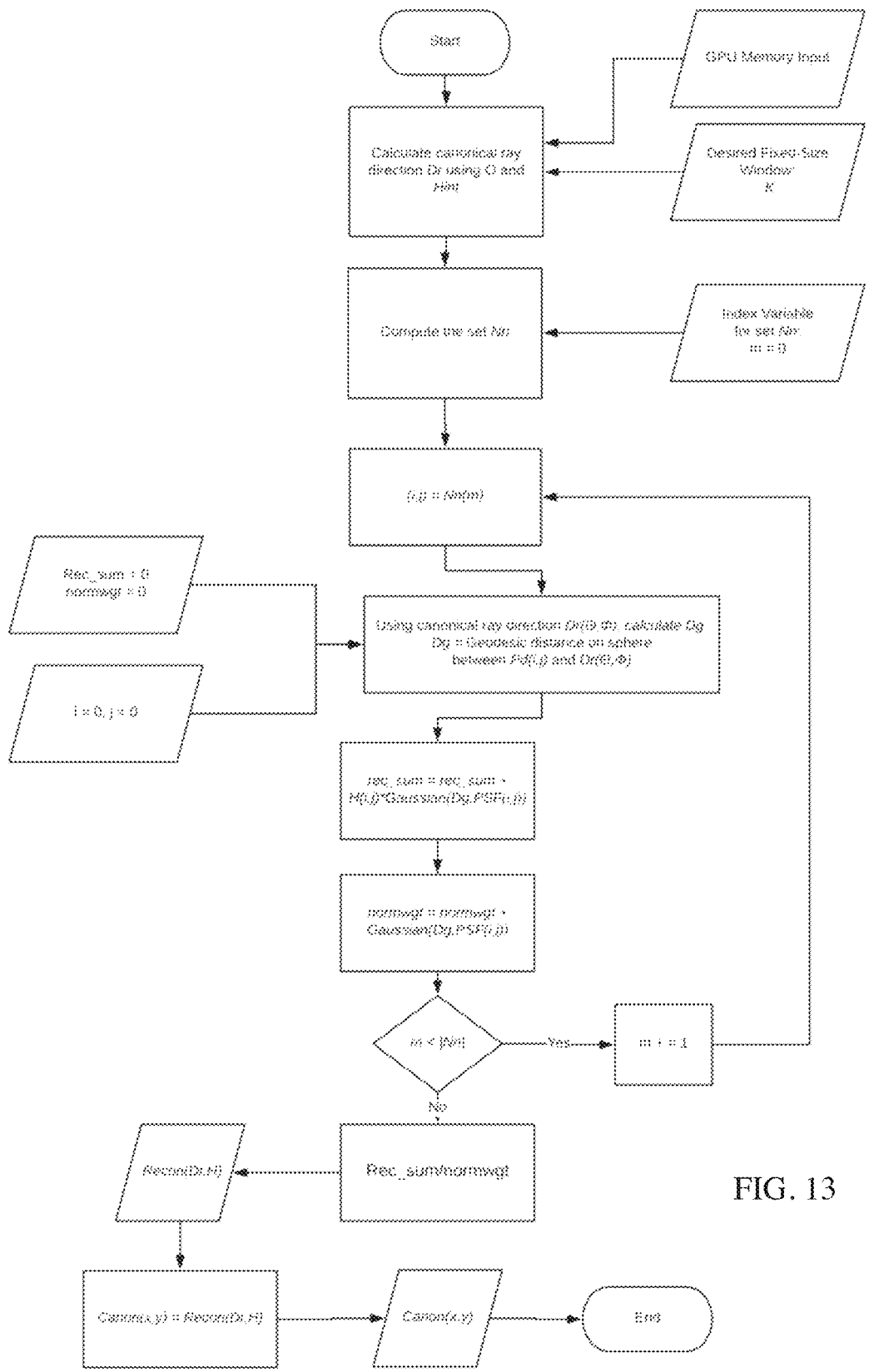
FIG. 13: an exemplary embodiment of the point-spread function canonical image reconstruction method using a fixed-size window.

FIGS. 9, 10 and 13 break down the process of arriving at steps (feature) 24 of FIG. 1 for calculating and generating the canonical image. As set out in FIG. 9, the light field data calculated at step 10 (FIG. 1) is assumed to have each of its coordinates represent an RGB value and, along with the observer location and the display parameters, are data inputs for the computer-implemented method according to the present disclosure. The hogel intersection point $H_{INT}(X_h, Y_h, Z_h)$ between canonical ray cast by the observer Xo and the hogel H(x,y) and the hogel image H(i,j) are then input. Additionally, a table of principle directions for each hogel pixel in the hogel image $P_d(i,j)$ and a table of the point-spread function sigma for each hogel pixel in the hogel PSF(i,j) are input into the computing system for processing. At the beginning of the process, x and y both equal 0. The canonical image Canon(x,y) is calculated using reconstruction function Recon(Dr,H). This process is performed for each hogel H(x,y) in the display $D(M_x, M_y)$. Once every hogel in the display has been calculated, the canonical image data is created, and the process is complete.

FIG. 10 elaborates on the canonical image reconstruction method Recon(Dr,H). This reconstruction method should not be seen as a limit on the patent disclosed herein, as this is but one method of reconstructing the canonical image. This computational method exhibits properties that make it highly amenable to acceleration using parallel computation. At the present time, graphics processing units (GPUs) are a very effective parallel processing platform on which light field simulation and canonical image calculation can be targeted on with good performance results. The methods we describe can be implemented effectively using a compute shader. The loop flow structure described in FIG. 9 can be parallelized such that each loop iteration executes as a separate compute shader thread. The inputs from FIG. 9 that had been moved from the system memory to the GPU memory are inputs for this processing steps shown in FIG. 10. These inputs are run through a custom piece of in-house software to calculate the canonical ray direction $Dr(\theta, \Phi)$ using observer location O and H(x,y) for each H(x,y) in the display $D(M_x, M_y)$. As described above, this is the process of tracing individual canonical rays from the hogel to the observer. Each canonical ray will have a unique $Dr(\theta, \Phi)$. After the canonical ray direction is calculated, the rec_sum, the normwgt and the (i,j) values of each hogel are input as equaling 0. Using the canonical ray direction $Dr(\theta, \Phi)$, the geodesic distance Dg is calculated between $P_d(i,j)$ and $Dr(\theta, \Phi)$. Dg is calculated using:

$$D_g = \cos^{-1}\left(\frac{(a \cdot b)}{(\|a\|\|b\|)}\right)$$

Using Dg, a new rec_sum is calculated by adding H(i,j)* Gaussian($D_g$, PSF(i,j)) to the current rec_sum of the process. Next, a new normwgt is calculated by adding Gaussian($D_g$, PSF(i,j)) to the current normwgt. The calculation of the canonical ray direction to the calculation of the normwgt value inclusive is repeated for every hogel pixel in the hogel. When the process has been repeated for each pixel in the hogel, the process proceeds to the calculation of Recon(Dr, H) by dividing the final rec_sum by the final normwgt. Since Canon(x,y) equals Recon(Dr,H), the canonical image for that hogel has been calculated and the process complete.

Figure 6:
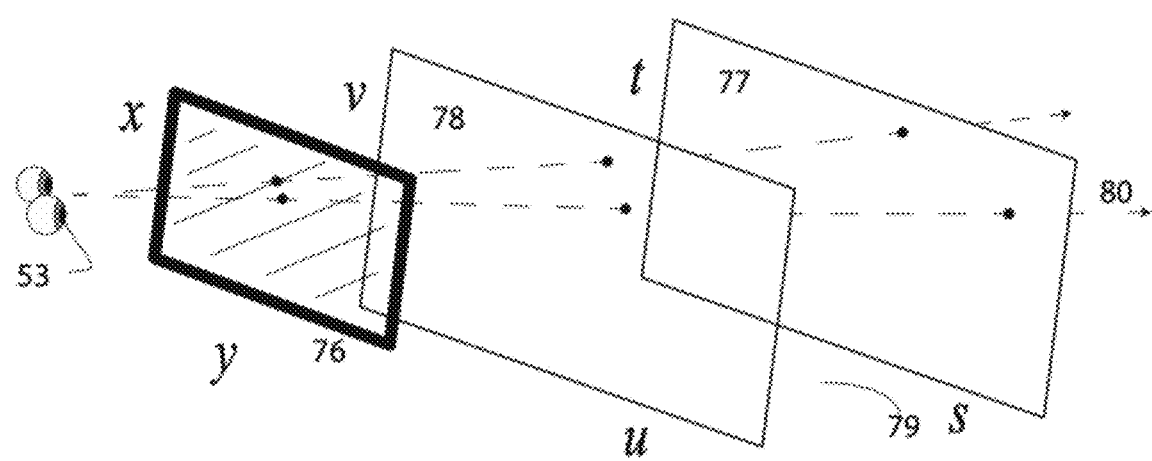
FIG. 6: illustrates schematically multiple planar parameterized rays out of each hogel.

FIG. 6 demonstrates the planar parameterization ray distribution method and the process of resampling a light field, described here as the volume of a rectangular cube (79), during display. Rays (80) are cast from the observer location (53) to every hogel in the observer plane (76). The image the observer views is determined by the ray's intersection with the (u,v) plane (78) and (s,t) plane (77).

The canonical image data can be saved as a 2D image file e.g. .png with a resolution matching, less than or greater to the light field display that will be in the final simulation. The canonical image data is not limited to any one particular image file and can be saved as a .jpeg, .gif among other formats. This simulation can employ variations on this model, for example tracing the canonical image from the observer position to arbitrarily specified hogel centers. This method replicates a certain degree of $D_{LP}$ randomness, a useful technique for simulating light field content on a nonoptimal display.

In the point-spread function full-window reconstruction method (FIG. 10), the contribution of every pixel in the elemental image is calculated in the reconstruction sum. For a display with a large directional resolution, computing this sum can require a large number of calculations, as the directional resolution essentially defines the number of terms (and number of iterations of the loop) that are required.

In practice, point spread functions are numerically such that their support in the angular domain is effectively finite. Thus, beyond the effective support of the point spread function, its contribution to the summation can be ignored without causing significant numerical difference in the final numbers computed [15].

FIG. 13 demonstrates the process of sampling only those hogel pixel within a fixed-size window that will have any numerically significant overlap with another hogel pixel. In practice, this effective support will determine the number of neighboring pixels that must be included in a reconstruction summation. It is known in the art that in an ideal display, individual point spread functions should overlap slightly to reconstruct a smooth continuous light field in the angular domain. Too much overlap will result in an angular reconstruction that attenuates the higher frequencies in the signal, thus degrading the perceived quality of the light field display. Based on knowing the support of the point spread functions provided, one can choose K (a window size dimension parameter) such that the smaller, approximate summation will produce very similar results to the full window summation. The set of $K^2$ nearest hogel pixel neighbours, where nearest is defined in terms of the geodesic distance on a sphere, can be understood as Nn. The index variable for the set Nn is m in which Nn(m) describes an (i,j) value in the set that corresponds to hogel pixel H(i,j). The index variable m is input as 0. We can index the set's individual elements with Nn(m) for m<|Nn|. With each iteration of the loop, the next m value in the set is calculated until all m values in the set Nn have been calculated. This is an exemplary embodiment of how to optimize the method in order to support real-time observer light field display simulation, particularly when integrated with VR viewing.

Figure 8:
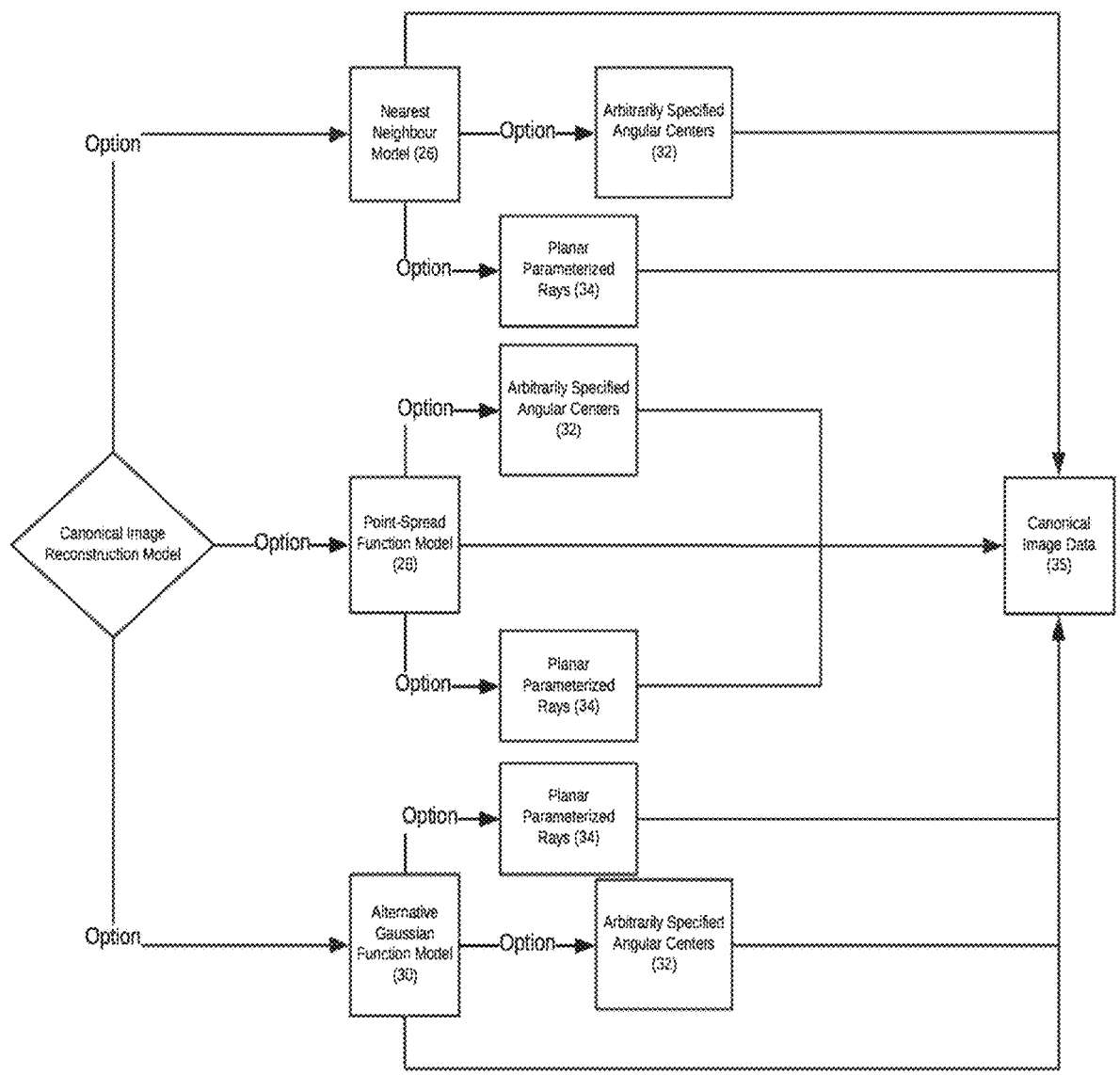
FIG. 8: a process flow of the available canonical image reconstruction models.

FIG. 8 is a flow diagram describing the steps involved in (24) (FIG. 1) which illustrates exemplary methods of reconstructing a canonical image. The canonical image can be reconstructed using, but is not limited to, the nearest-neighbour reconstruction method (26) or the point-spread-function-based method (28), as detailed above. Additionally, another alternative point spread function-based method that is not based on a Gaussian function (30) can be employed. The option of arbitrarily specifying the angular principle directions for each directional pixel in the display (32) or employing planar parameterized rays out of each hogel (34) exists for options (26), (28) and (30). Once the canonical image data (35) is reconstructed using one of the aforementioned techniques, a plane representing the simulated light field display is rendered using a texture mapping technique with the canonical image as the texture (36) (FIG. 1).

Figure 4B:
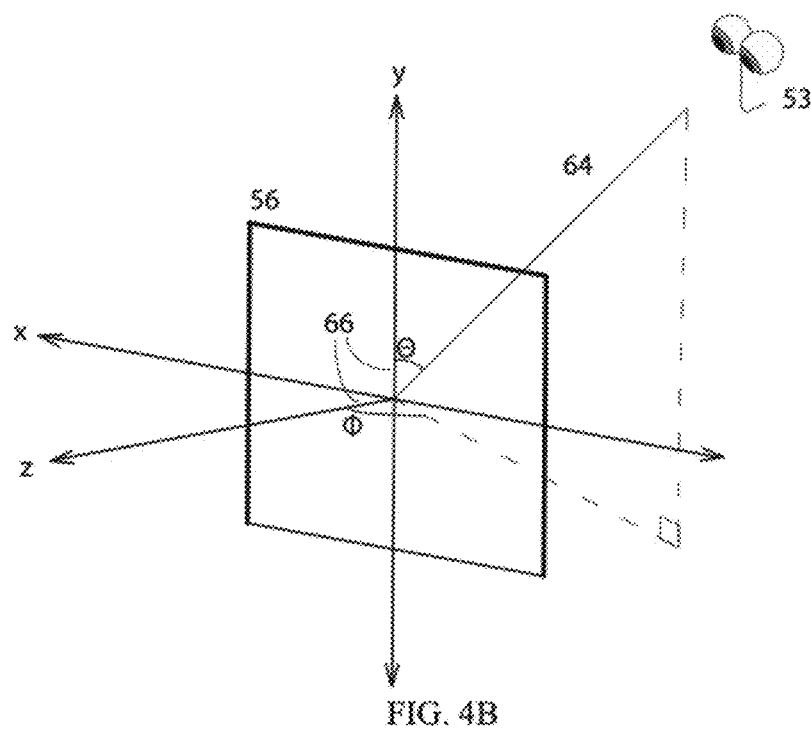
FIG. 4B: is an isometric illustration of the interaction between a canonical ray and an individual hogel during the canonical image generation process.

For further visual aid, FIG. 4B illustrates the interaction between a single canonical ray (64) and an individual hogel (56) during the canonical image generation process. The angular pair (66) describes the angular coordinates (θ,ϕ) of the canonical ray emitted by the hogel relative to the observer (53). As mentioned above, this figure is but one exemplary embodiment of how and where a canonical image ray can intersect an individual hogel.

Figure 5A:
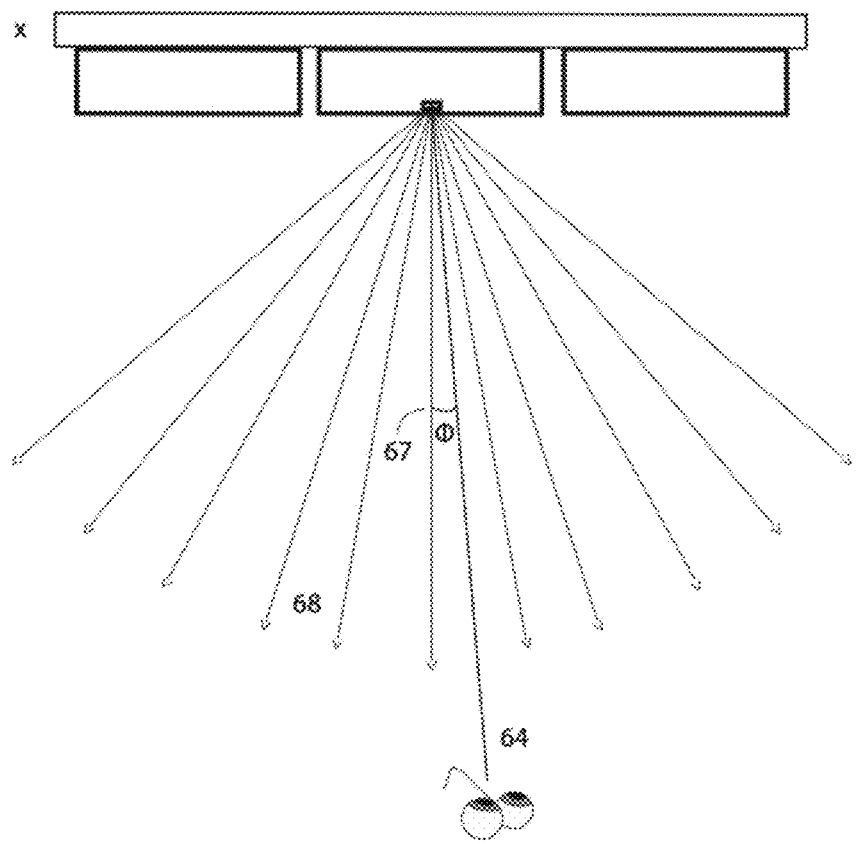
FIG. 5A: illustrates an observer between emitted RGB (red, green and blue) light rays and the nearest neighbour construction method.

FIG. 5A is an exemplary embodiment of how the canonical image can be reconstructed using the nearest neighbour reconstruction method. A single hogel emits several RGB light rays (68) spanning its field of view. The RGB light ray that the observer (53) sees is determined by which RGB light ray has the closest angular pair (67) to the canonical ray (64) cast by the observer relative to the hogel center. For this overhead illustrative embodiment, only ϕ is demonstrated, but, both angles (θ,ϕ) are used in determining which RGB light ray the observer views. This method is not limited to using RGB light rays as different wavelengths of light can be used for the calculation of the canonical image.

Figure 5B:
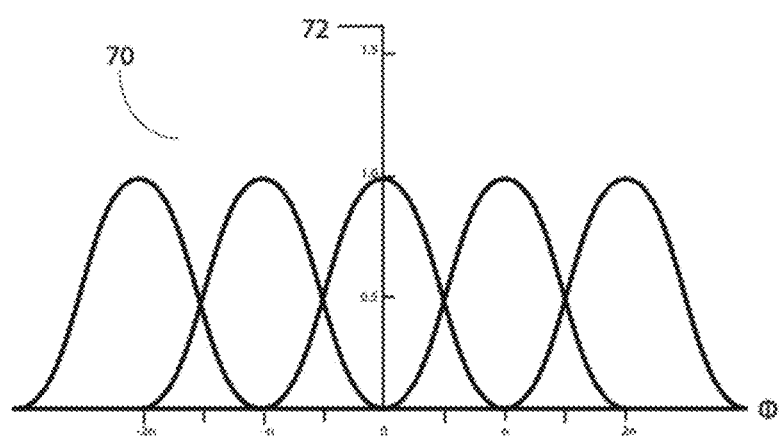
FIG. 5B: illustrates schematically sampling light rays using a Gaussian function to calculate the light ray's radiant intensity at specified angles.

Using the same ray-emission origin as FIG. 5A, FIG. 5B demonstrates graphically a second exemplary embodiment of how the canonical image can be reconstructed using a Gaussian-based model to represent the spread of the radiant intensity of an RGB ray (72) emitted by a hogel. Each radiant intensity spread of a hogel's RGB ray is represented by a single bell curve. It should be noted that a Gaussian function is but one of many exemplary embodiments of a function used in the point spread function-based model 30 (FIG. 8).

Figure 7:
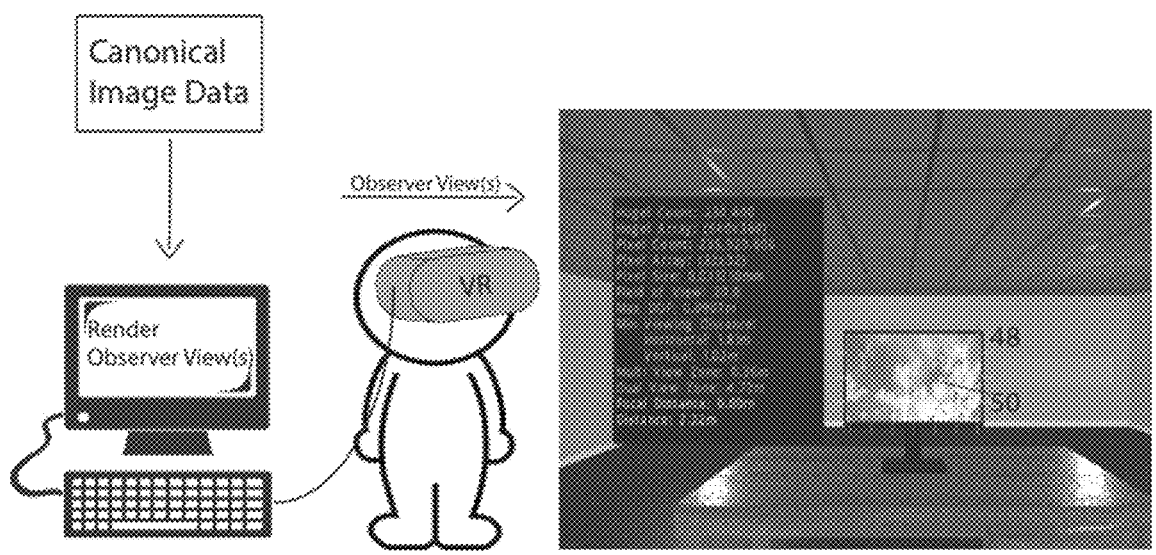
FIG. 7: illustrative representation of rendering simulated light field display view(s) and a virtual observer viewing the simulated light field display(s).

FIG. 7 is a schematic representation of rendering simulated light field display view(s) texturing the simulated light field display with the canonical image to create the radiance image (36) (FIG. 1). Using the canonical image reconstructed in prior steps, the display model is textured with the light field (50) and displayed on the simulated light field display (48). The observer views are then rendered on a computer and the evaluation of the light field display can commence. Depending on the method of evaluation, the observer view(s) can be continuously re-rendered and simulated depending upon transformations by the simulated observer. The simulation can then be explored in a variety of ways, including, but not limited to, virtual reality viewing, command line data, 2D interactive viewing and artifact metric evaluation.

EXAMPLES

Example 1: Exemplary Light Field Display Evaluation Using VR 3D

The following illustrative embodiment of the invention is not intended to limit the scope of the invention as described and claimed herein, as the invention can successfully implement a plurality of system parameters. Consider the case of providing a virtual reality based light field display simulator. A light field is generated by rendering a 3D scene using light field-based rendering techniques known to the prior art. In this illustrative embodiment, the rendering of a 3D scene in (10) (FIG. 1) is created using a modified Unreal Engine 4™ with an added light field rendering capability. This method employs the Burnett et al. [2] oblique light field rendering technique so that the geometric objects can be staggered and positioned within the inner and outer frustum. This allows the objects to cover all areas of the display volume. The 3D scene can be visualized as a cube existing in 3D space as illustrated in FIGS. 2A/2B. In other words, this technique creates the light field image data that will be displayed on the simulated light field display.

For illustrative purposes, let us assume a simulated light field display defined as $D=(M_x, M_y, N_u, N_v, f, \alpha, D_{LP})$. This illustrative embodiment has a spatial resolution $(M_x, M_y)$ of 640×360 and directional resolution $(N_u, N_v)$ of 64×64, a focal length f with a field of view of 40 degrees and a lens pitch $D_{LP}$ of 1.0 mm. This illustrative example is not intended to limit the scope of the invention, as light field display parameters can vary from display to display that define its spatial and angular features. In the illustrative embodiment, we assume that the aforementioned display has a planar parameterized set of output rays given the display parameters above.

For the purposes of this exemplary embodiment, we assume an optimized hogel array with a singular warping function α. This assumption is beneficial for evaluating the performance of the intended, ideal light field display. However, as issues are sure to arise in any process, arbitrarily specified angular distribution can be alternatively implemented to alter/distort the angular distribution of individual directional pixels in each hogel which can help to simulate display defects. For the purposes of this exemplary embodiment, an optimized hogel array is simulated because the goal of the simulation is to explore the optimal light field display and evaluate the content displayed thereupon. The observer position and direction will not be specified in this illustrative embodiment due to the use of a VR helmet, such as the Oculus Rift™, during the simulation viewing stage. During this stage, the position and orientation of the headset as worn by the user will drive the observer position and direction parameters, corresponding to one observer per eye. While it is not necessary to determine the observer position and orientation, it must be specified that there are two observers for canonical image generation purposes. A canonical image will be traced between the display and each observer individually. In this exemplary embodiment, the observer image will be captured by a pinhole camera.

We assume for the purposes of this exemplary embodiment that the display optics are such that we generate the 'optimal' set of point spread functions. We assume these are an ideal Gaussian function. A canonical image is generated using the given parameters for each observer eye of the VR system as laid out above. The canonical image is created using a custom Vulkan™ compute shader as previously described herein, configured to receive the parameter inputs and carry out the steps set out in FIG. 9 then 13. The steps in FIG. 13 describe canonical image reconstruction for a fixed-size window, which is a reasonable numerical approximation of the "optimal" set of point spread functions as described above. Creating the canonical image using the steps set out in FIG. 9 then 10 is an option when the display being modelled does not have such "optimal" point spread functions. In this case, a fixed-size window cannot be assumed while maintaining good numerical properties. Thus, a greater execution time is required and is less likely to be able to achieve a high frame rate result required for VR usage. Using the steps laid out in FIGS. 9 and 13 allows a single plane having the physical size of the exemplary display rendered to be displayed on the two separate physical displays of the VR headset. For each eye, the plane is textured with a different canonical image, using standard texture mapping techniques known in computer graphics. The image rendered for each plane corresponds to the perspective of its respective eye relative to the light field display. Two separately displayed images make stereoscopic viewing of the light field display feasible.

Figure 12:
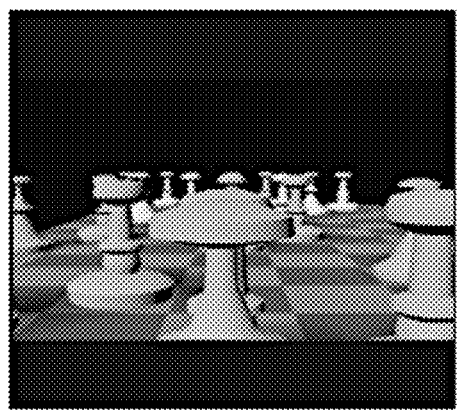
FIG. 12: a screenshot of simulated observer views which demonstrate the effective resolution of a simulated light field display based on a fixed spatial resolution and a varied directional resolution.
Figure 12:
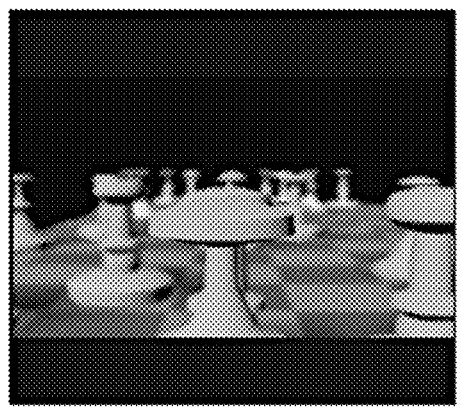
Figure 12:
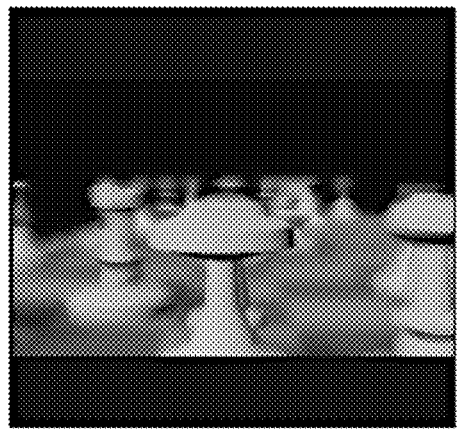

Up until this point, FIG. 2A/2B were used to demonstrate a 3D environment/light field that could be used as input for the canonical image generation method. These figures were chosen due to the simplicity of visualization and conceptualization. For the further purposes of this illustrative embodiment however, the image referenced from this point forward will be the image displayed in FIG. 12. FIG. 12 provides a more accurate example of an image that may be viewed in the simulator for the purposes of optimizing display parameters or any other objective not explicitly described herein.

After perceiving and evaluating the quality of the simulated light field display, the display parameters can be altered to generate new simulators which is useful in discovering optimal display parameters. FIG. 12 is an exemplary embodiment of varying the angular resolution of the simulated display to optimize the light field display observer's experience. If the physical dimensions and spatial resolution of each simulated displays are fixed, then these angular resolution variations allow for the rapid exploration and evaluation of display depth of field. In this exemplary embodiment, the angular resolutions are 512×512 (98), 256×256 (100) and 128×128 (102). Shown in the three images, as the angular resolution of the display decreases, objects at depth become more blurry with less detail. Comparing different display parameters, in this case angular resolution, can reveal the strengths and weaknesses of different light field display models; these strengths and weaknesses can be, but are not limited to, image contrast, display resolution at different depths, and depth-of-field. These simulated observations are critical for the effective and efficient design of light field displays.

Example 2: Using the Simulator to Evaluate Compression Artifacts

The type of light field datasets required to drive high-quality displays represent a significant increase in size relative to even high-end 2D displays. New techniques for rendering light fields must be developed to obtain the massive throughput required. Likewise, these massive data rates suggest the requirement for new light field compression techniques to efficiently transport such light field data. However, it is challenging to assess the quality of new rendering or compression techniques without a physical display.

Existing quality metrics cannot be applied to elemental images of a light field display. These methods do not consider the directional nature of an elemental image. Simulated views of a display based on a given light field dataset should be used and compared to make quality assessments of light field processing techniques.

Figure 11:
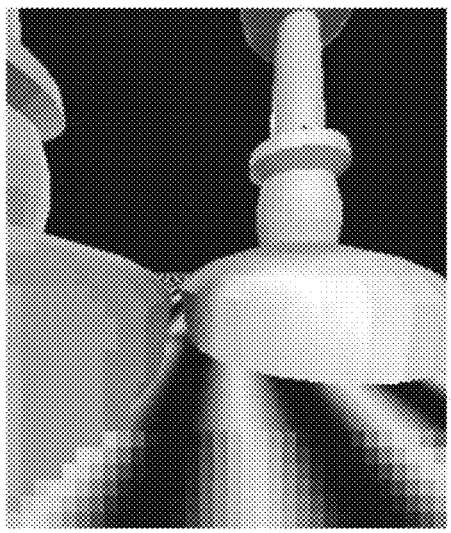
FIG. 11: a screenshot of simulated observer views which demonstrates the presence of artifacts and the perception of artifacts at different observer locations.
Figure 11:
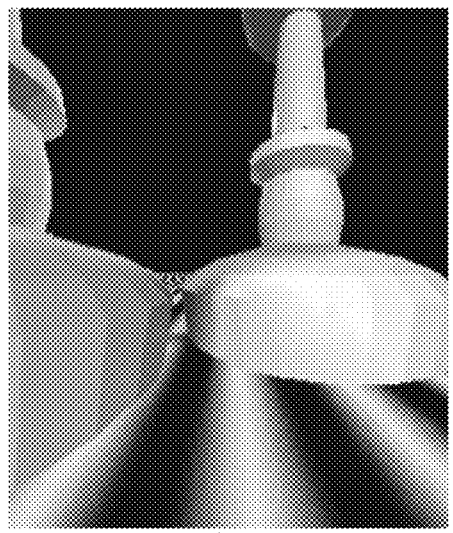
Figure 11:
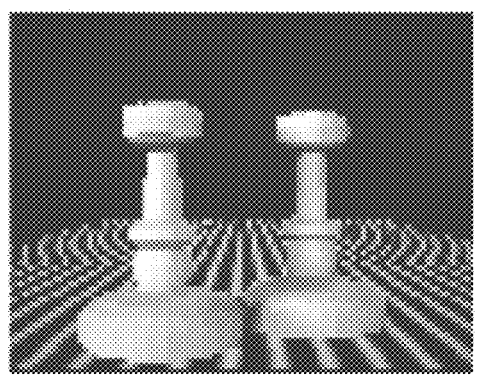
Figure 11:
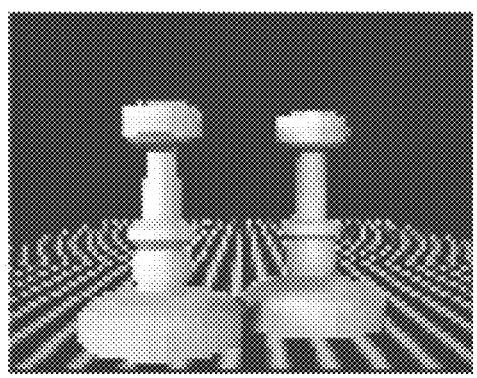

In this exemplary embodiment, a light field display is simulated to evaluate light field compression and decompression techniques. FIG. 11 is an exemplary embodiment of simulated views which demonstrates the presence of artifacts and the perception of artifacts. For the purposes of this exemplary embodiment, the same display parameters from Example 1 are presumed. This should not be interpreted as a limitation on the method's ability to model other display parameters, rather viewed as an intentional choice to enhance consistency. Further, a ground truth light field is rendered using the rendering techniques as described in Example 1.

A copy of the aforementioned ground truth is created and is run through a compression/decompression process. For example, each elemental image in the light field can be compressed using standard JPEG compression on the individual 64×64 images, etc. The resulting light field will have some artifacts when compared to the original light field ground truth. This compression technique should not be seen as a limitation on this exemplary embodiment, it is simply an illustrative example of a possible compression technique that can be assessed using our method.

The compressed/decompressed light field can be compared with the ground truth to assess the impact of potential artifacts on an observer viewing the light field. The light field display generates a set of observer views for the display corresponding to each of the two light fields. That is to say, the light field display generates a set of simulated views for the display showing the ground truth light field and the same set of simulated views for the display while showing the light field with potential artifacts due to the compression and decompression processing.

Each view of the ground truth is paired with its respective view of the compressed/decompressed view i.e. two views are a pair if they represent the same observer position and direction viewing their respective light field. In an exemplary embodiment, these views can be compared with various image comparison metrics. One exemplary comparison technique is to compare the images using the SSIM metric [19] which is used to measure or predict image quality based on an initial uncompressed or distortion-free image as reference. This metric incorporates aspects of human perception and perceptual phenomena, including both luminance masking and contrast masking terms, it makes it the ideal technique for evaluating artifacts that would be perceived by an observer and omitting those artifacts that, while present, would not affect that final light field image. Using this metric, the simulator can be used to facilitate perceptual comparison of light fields in an analogous way that 2D images are often compared in image/video analysis. Additionally, this metric could be employed to observe whether artifacts may be restricted to certain ranges of view, and in terms of display optimizations based on perception and/or user experience, it may in certain cases be a reasonable trade-off to accept artifacts in certain observer ranges more so than others. This exemplary embodiment to evaluate compression and decompression effects could be performed using other metrics and the use of this metric should not be seen as limiting the scope of the disclosed invention. Using this observer/metric data, or any other metric of comparable utility, the simulator is a useful tool for efficiently and effectively designing light field displays.

FIG. 11 is a screenshot of simulated views which demonstrates the presence of artifacts and the perception of artifacts. The upper-leftmost image (90) is a light field that has been processed through a CODEC with perceptible artifacts, taken from close to the simulated light field display and the upper-rightmost image (92) is the same image, unprocessed through a CODEC, with no perceptible artifacts, taken from the same location. The artifacts in (90) are present in the lower-leftmost section of the image. The lower-leftmost image (94) is the same image as (90) however the observer location relative to the simulated light field display is located at an optimal observer viewpoint. The lower-rightmost image (96) is the same image as (92) however the observer location relative to the simulated light field display, as with (94), is at an optimal observer location. Comparing different views from different observer locations can be useful in determining whether artifacts, while present, will have an effect on the observer image from an optimal observer location. In this exemplary embodiment, the artifacts that are present in (90) do not have a significant impact on the quality of image (94) when viewed from an optimal observer location, once compared with (96).

REFERENCE LIST

[01] ALPASLAN, Z. Y., HUSSEIN S. EL-GHOROURY, JINGBO CAI. "Parametric Characterization of Perceived Light Field Display Resolution." Society for Information Display International Symposium Digest of Technical Papers, 2016. Vol. 47-1, pp. 1214-1245.

[02] BURNETT, THOMAS L. "Light-field Display Architecture and the Challenge of Synthetic Light-field Radiance Image Rendering." SID Digest, 2017. Vol. 61-1, pp. 899-902.

[03] CATMULL, E. "A subdivision algorithm for computer display of curved surfaces." PhD thesis, University of Utah, 1974.

[04] CHAI, J.-X., XIN TONG, SHING-CHOW CHAN, AND HEUNG-YEUNG SHUM. "Plenoptic Sampling" SIGGRAPH '00 Proceedings of the 27th Annual Conference on Computer Graphics and Interactive Techniques, July, 2000. pp 307-318.

[05] CLARK, J. J., MATTHEW R. PALMER AND PETER D. LAWRENCE. "A Transformation Method for the Reconstruction of Functions from Nonuniformly Spaced Samples" IEEE Transactions on Acoustics, Speech, and Signal Processing. October 1985. pp 1151-1165. Vol. ASSP-33, No. 4.

[06] FATTAL, D., Z. PENG, T. TRAN, S. VO, M. FIORENTINO, J. BRUG AND R. G. BEAUSOLEIL "A Multi-directional backlight for a wide-angle, glasses-free 3D display" 2013 IEEE Photonics Conference, IPC 2013, vol. 495, no. 7441, pp. 24-25, 2013.

[07] GORTLER, S. J., RADEK GRZESZCZUK, RICHARD SZELISKI, AND MICHAEL F. COHEN. "The Lumigraph" SIGGRAPH '96 Proceedings of the 23rd Annual Conference on Computer Graphics and Interactive Techniques, August 1996. pp 43-52.

[08] HALLE, M. W., AND ADAM B. KROPP. "Fast Computer Graphics Rendering for Full Parallax Spatial Displays" SPIE, 1997. pp 1-8.

[09] HAMILTON, M., CHUCK RUMBOLT, THOMAS BUTYN, DONOVAN BENOIT, ROBERT LOCKYER, MATTHEW TROKE. "Light Field Display Simulator for Experience and Quality Evaluation." Society for Information Display International Symposium Digest of Technical Papers, 2018. Vol. 49-1, pp. 1523-1526.

[10] HUANG, H., HONG HUA. "Modeling the Eye's Response in Viewing 3D Light Field Display." OSA Technical Digest, 2017.

[11] HUANG, H., HONG HUA. "3D Light Field Displays." Optics Express, vol. 25-16, pp. 18508-18525, 2017.

[12] LEE, B.-R., JUNG-YOUNG SON, HYOUNG LEE, SUMIO YANO, HYUNG KI SON, "A Simulator for a Light Field Display." Proc. SPIE 10219, Three-Dimensional Imaging, Visualization, and Display 2017, 102190D (10 May 2017); doi: 10.1117/12.2263612.

[13] KLUG, M., THOMAS BURNETT, ANGELO FANCELLO, ANTHONY HEATH, KEITH GARDNER, SEAN O'CONNELL, CRAIG NEWSWANGER. "A Scalable, Collaborative, Interactive Light-field Display System." Society for Information Display International Symposium Digest of Technical Papers, 2013. Vol. 44-1, pp. 412-415.

[14] LEVOY, M., AND PAT HANRAHAN. "Light Field Rendering" SIGGRAPH. pp 1-12.

[15] MARSCHNER, S. R., & LOBB, R. J. (1994). An evaluation of reconstruction filters for volume rendering. In VIS '94: Proceedings of the conference on Visualization '94 (pp. 100-107). Los Alamitos, Calif., USA: IEEE Computer Society Press.

[16] MATSUBARA, R., ZAHIR Y. ALPASLAN, HUESSEIN S. EL-GHOROURY. "Light field display simulation for light field quality assessment." Proc. SPIE 9391, Stereoscopic Displays and Applications XXVI, 93910G, 2015.

[17] VIERI, C., GRACE LEE, NIKHIL BALRAM, SANG HOON JUNG, JOON YOUNG YANG, SOO YOUNG YOON, IN BYEONG KANG. "An 18" megapixel 4.3" 1443 ppi 120 Hz OLED display for wide field of view high acuity head mounted displays." Journal of the Society for Information Display, vol. 26-5, pp. 314-324, May 2018.

[18] ZWICKER, M., W. MATUSIK, F. DURAND, H. PFISTER. "Antialiasing for Automultiscopic 3D Displays" Eurographics Symposium on Rendering. 2006.

[19] WANG, Z., BOVIK, A. C., SHEIKH, H. R., & SIMONCELLI, E. P. (2004). Image quality assessment: From error visibility to structural similarity. *IEEE Transactions on Image Processing,* 13(4), 600-612. https://doi.org/10.1109/TIP.2003.819861

The embodiments of the invention in which an exclusive property or privilege is claimed are defined as follows:

1. A computer-implemented method for simulating a three dimensional light field display, the method comprising:
   receiving, by a computer processor, a plurality of data inputs comprising:
      light field display data for a virtual light field display comprising a set of hogels, each hogel comprising a plurality of hogel pixels; and
      simulated observer parameters comprising an observer position relative to the virtual light field display;
   applying a ray intersection procedure to the set of hogels in the virtual light field display to provide an array of individual canonical rays traced between the observer position and a hogel intersection point, wherein each hogel in the set of hogels provides an individual canonical ray based on the observer position, and each of the individual canonical rays has a first end point at a hogel in the set of hogels in the virtual light field display and a second end point at the observer position;
   calculating a canonical ray direction for each of the individual canonical rays using the observer position and the hogel intersection point;
   reconstructing a canonical image of a simulated observer view at the observer position by applying a reconstruction calculation for each hogel in the virtual light field display based on the canonical ray direction for each hogel to the observer position;
   texture mapping the canonical image as a texture for a plane which represents the simulated light field display; and
   rendering the plane from the observer position with the canonical image as the texture to produce the simulated observer view.

2. The computer-implemented method of claim 1, wherein the observer position is based on a pinhole camera model.

3. The computer-implemented method of claim 1, wherein the observer position is based on a multi-camera model.

4. The computer-implemented method of claim 1, wherein the canonical image is generated using a point-spread function.

5. The computer-implemented method of claim 4, wherein the point-spread function uses a Gaussian function.

6. The computer-implemented method of claim 1, wherein the canonical image is generated by applying a nearest neighbour reconstruction function.

7. The computer-implemented method of claim 1, further comprising repeating the method for a light field display.

8. A computing system comprising at least one processor configured to carry out a method for simulating a three dimensional light field display, comprising the steps of:
   receiving, by a computer processor, a plurality of data inputs comprising:
      light field display data for a virtual light field display comprising a set of hogels, each hogel comprising a plurality of hogel pixels; and
      simulated observer parameters comprising an observer position relative to the virtual light field display;
   applying a ray intersection procedure to the set of hogels in the virtual light field display to provide an array of individual canonical rays traced between the observer position and a hogel intersection point, wherein each hogel in the set of hogels provides an individual canonical ray based on the observer position, and each of the individual canonical rays has a first end point at a hogel in the set of hogels in the virtual light field display and a second end point at the observer position;
   calculating a canonical ray direction for each of the individual canonical rays using the observer position and the hogel intersection point;
   reconstructing a canonical image of a simulated observer view at the observer position by applying a reconstruction calculation for each hogel in the virtual light field display based on the canonical ray direction for each hogel to the observer position;
   texture mapping the canonical image as a texture for a plane which represents the simulated light field display; and
   rendering the plane from the observer position with the canonical image as the texture to produce the simulated observer view.

9. The computer system according to claim 8, wherein the observer position is based on a pinhole camera model.

10. The computer system according to claim 8, wherein the observer position is based on a multi-camera model.

11. The computer system according to claim 8, wherein the canonical image is generated using a point-spread function.

12. The computer system according to claim 11, wherein the point-spread function uses a Gaussian function.

13. The computer system according to claim 8, wherein the canonical image is generated by applying a nearest neighbour reconstruction function.

14. The computer system according to claim 8, further comprising repeating the method for simulating a light field display.

15. The computer-implemented method of claim 1, wherein each canonical ray is traced to the center of each individual hogel.

16. The computer-implemented method of claim 1, wherein the method generates a plurality of canonical images.

17. The computer-implemented method of claim 16, wherein the plurality of canonical images is based on the simulated observer parameters.

18. The computer-implemented method of claim 1, wherein the plurality of data inputs define the spatial and angular features of the light field display.

19. The computer-implemented method of claim 1, wherein the plurality of data inputs comprise one or more of spatial resolution, directional resolution, focal length, field of view, and lens pitch.

20. The computer-implemented method of claim 1, wherein the rendering displays the canonical image in command line mode, in virtual reality, on a 2D interactive interface, offline for artifact metric evaluation, or any combination thereof.

21. The computer system according to claim 8, wherein each canonical ray is traced to the center of each individual hogel.

22. The computer system according to claim 8, wherein the method generates a plurality of canonical images.

23. The computer system according to claim 22, wherein the plurality of canonical images is based on the simulated observer parameters.

24. The computer system according to claim 8, wherein the plurality of data inputs define the spatial and angular features of the light field display.

25. The computer system according to claim 8, wherein the plurality of data inputs comprise one or more of spatial resolution, directional resolution, focal length, field of view, and lens pitch.

26. The computer system according to claim 8, wherein the rendering displays the canonical image in command line mode, in virtual reality, on a 2D interactive interface, offline for artifact metric evaluation, or any combination thereof.

27. The method according to claim 1, further comprising changing the observer position to test the effective viewing range of the simulated light field display.

28. The method according to claim 1, wherein generating the canonical image further comprises reconstructing a radiance value for each canonical ray at the hogel intersection point.

29. The computer system according to claim 8, further comprising changing the observer position to test the effective viewing range of the simulated light field display.

30. The computer system according to claim 8, wherein generating the canonical image further comprises reconstructing a radiance value for each canonical ray at the hogel intersection point.

* * * * *